(12) United States Patent
Ramaswamy

(10) Patent No.: US 11,575,975 B2
(45) Date of Patent: Feb. 7, 2023

(54) METHODS, SYSTEMS, AND APPARATUSES FOR IMPROVED CONTENT SCORING AND DELIVERY

(71) Applicant: COMCAST CABLE COMMUNICATIONS, LLC, Philadelphia, PA (US)

(72) Inventor: Srinath V. Ramaswamy, East Windsor, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/689,792

(22) Filed: Nov. 20, 2019

(65) Prior Publication Data
US 2021/0152892 A1    May 20, 2021

(51) Int. Cl.
*H04N 21/647* (2011.01)
*H04L 65/80* (2022.01)
*H04N 21/258* (2011.01)
*H04N 21/24* (2011.01)
*H04N 21/442* (2011.01)
*H04N 21/845* (2011.01)
*H04N 21/2383* (2011.01)

(52) U.S. Cl.
CPC ....... *H04N 21/64738* (2013.01); *H04L 65/80* (2013.01); *H04N 21/2383* (2013.01); *H04N 21/2402* (2013.01); *H04N 21/25825* (2013.01); *H04N 21/44209* (2013.01); *H04N 21/8455* (2013.01)

(58) Field of Classification Search
CPC .... H04L 43/04; H04L 43/0829; H04L 43/087
See application file for complete search history.

(56) References Cited

U.S. PATENT DOCUMENTS

| | | | | |
|---|---|---|---|---|
| 5,345,600 A | * | 9/1994 | Davidson | H04B 7/12 455/501 |
| 9,015,335 B1 | * | 4/2015 | Gigliotti | H04N 21/8455 709/231 |
| 9,106,887 B1 | * | 8/2015 | Owen | H04L 41/22 |
| 2005/0076327 A1 | * | 4/2005 | Helal | G06F 8/30 717/100 |
| 2008/0115007 A1 | * | 5/2008 | Jalali | H04N 21/2383 714/1 |
| 2014/0372568 A1 | * | 12/2014 | Clark | H04L 65/4084 709/219 |
| 2015/0036051 A1 | * | 2/2015 | Broberg | H04N 9/646 348/571 |

(Continued)

*Primary Examiner* — Barbara B Anyan
(74) *Attorney, Agent, or Firm* — Ballard Spahr LLP

(57) ABSTRACT

Methods, systems, and apparatuses for improved content scoring and delivery are described. A quality score for delivered content may be determined based on one or more output metrics. A first quality score may be provided to a content distribution network. The content distribution network may instruct the user device, or the user device may determine without receiving such an instruction, of methods/processes by which it may improve the one or more output metrics associated with output of the delivered content by adjusting one or more output parameters. The first quality score may also be used by the content distribution network to determine methods/processes by which network-related parameters and constraints may be managed in order to improve the quality of delivered content.

20 Claims, 10 Drawing Sheets

(56) References Cited

U.S. PATENT DOCUMENTS

| 2016/0028881 | A1* | 1/2016 | Assem | H04L 43/50 |
| | | | | 370/252 |
| 2017/0012884 | A1* | 1/2017 | Ho | H04L 1/0076 |
| 2017/0149857 | A1* | 5/2017 | Clark | H04L 65/602 |
| 2021/0136435 | A1* | 5/2021 | Stobbart | H04N 21/44209 |

* cited by examiner

METHODS, SYSTEMS, AND APPARATUSES FOR IMPROVED CONTENT SCORING AND DELIVERY

BACKGROUND

The quality of content delivered through a content distribution network may be affected by an array of network-related and user device-related constraints. At times when content is being requested by a large number of user devices, the quality level of content delivered at many user devices may be negatively impacted due to bandwidth bottlenecks, deployment schemes, and other network-related constraints. User devices may be similarly constrained by resource availability as well as by external sources of interference. In order to ensure each user device is supplied with requested content at an optimal quality level, content may be scored as it is delivered to, or as it is output by, user devices. Content scores may be used by the content distribution network, as well as by the user devices, to improve the quality level of delivered content. These and other considerations are addressed by the present description.

SUMMARY

It is to be understood that both the following general description and the following detailed description are exemplary and explanatory only and are not restrictive. Methods, systems, and apparatuses for improved content scoring and delivery are described herein. In order to provide optimal quality, user devices of a content distribution network, or the content distribution network itself, may determine a quality score for delivered content based on one or more metrics associated with output of the delivered content at user devices as well as attributes related to the content itself.

A first quality score determined by a given user device for a first content segment may be provided to the content distribution network. The content distribution network may instruct the user device, or the user device may determine without receiving such an instruction, of methods/processes by which the user device may improve the one or more output metrics associated with output of the delivered content by adjusting one or more output parameters. The first quality score may also be used by the content distribution network to determine methods/processes by which network-related parameters and constraints may be managed in order to improve the quality of delivered content. The content distribution network may deliver a second content segment to the user device. A second quality score for the second content segment may be determined by the user device or by the content distribution network. The second quality score may be greater than the first quality score, thereby indicating an improved quality of delivered content.

This summary is not intended to identify critical or essential features of the present description, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the methods and systems described herein.

DETAILED DESCRIPTION

Figure 1:
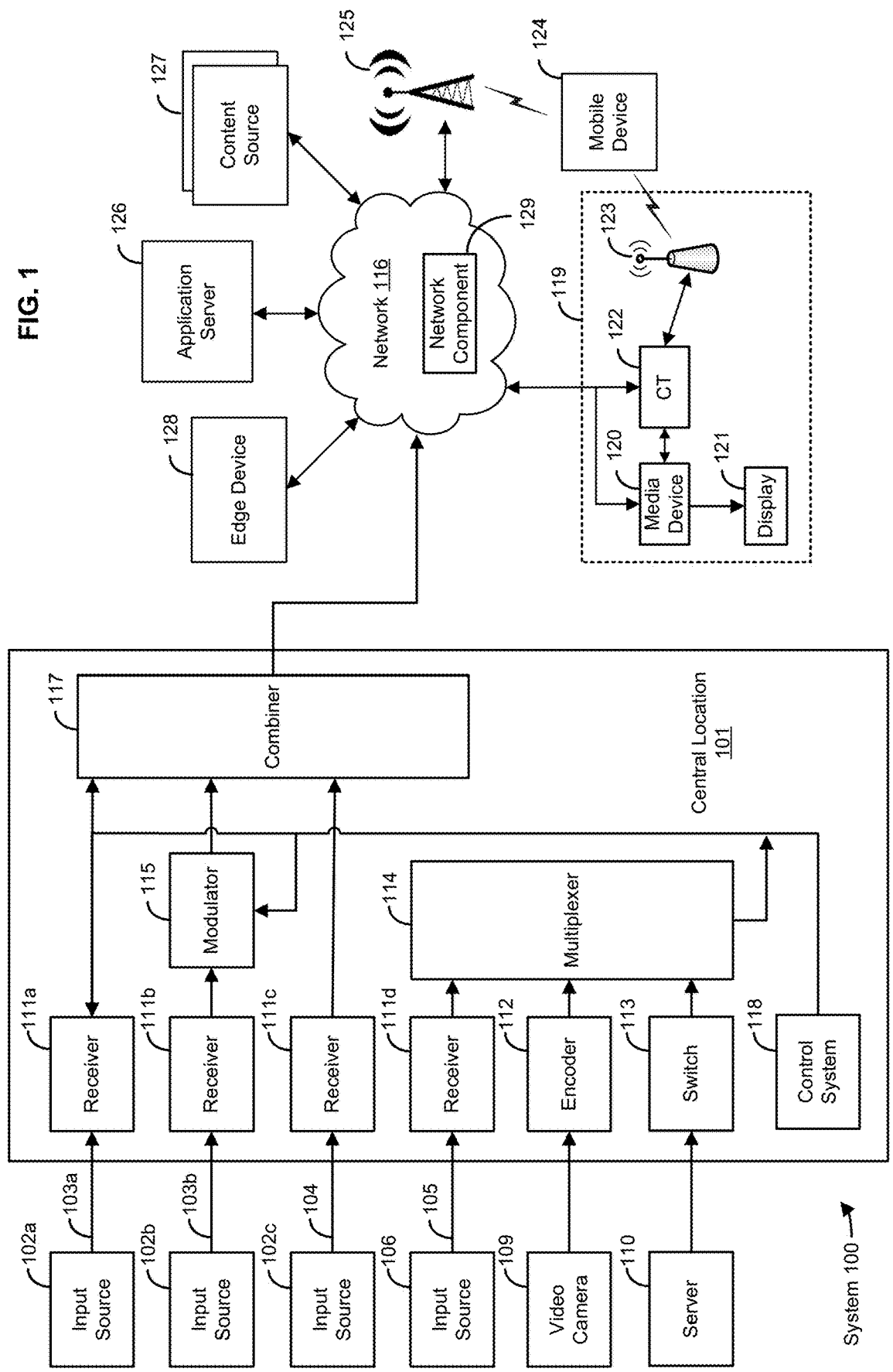
FIG. 1 shows an example system for delivering content.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). "Content segment," as the phrase is used herein, may be a portion of a content item (e.g., a duration of the content item), a number of packets of data relating to the content item, a chapter/scene of the content item, and the like. Content may be electronic representations of video, audio, text and/or graphics, which may be but is not limited to electronic representations of videos, movies, or other multimedia, which may be but is not limited to data files adhering to MPEG2, MPEG, MPEG4 UHD, HEVC, HDR, 4 k, 8 k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Dolby Digital, Atmos, AAC, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "sending" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio. This detailed description may refer to a given entity performing some action. It should be understood that this language may in some cases mean that a system (e.g., a computer) owned and/or controlled by the given entity is actually performing the action.

The present description relates to methods, systems, and apparatuses for improved content scoring and delivery. A quality level associated with content delivered through a content distribution network, such as video content, may be affected by an array of network-related and/or user device-related constraints. These constraints may lead to a low quality of experience ("QoE") for a user of a given user device. A user's QoE may relate to a given content segment's output quality, which may be affected by bitrate, error rate, noise, a combination thereof, and/or the like. One or more metrics may be determined, referred to herein as "QoE metrics" or simply "output metrics," that pertain to a user's experience of delivered content segments. QoE metrics may be determined at, or transmitted from, a user device. For example, a user device may analyze a video-on-demand ("VOD") content segment received for output at the user device and, based on that analysis, determine a quality level using the QoE metrics. Additionally, or alternatively, an upstream device of the content distribution network may receive the QoE metrics from the user device and then determine a quality level using the QoE metrics. QoE metrics may be used to monitor content delivery, such as delivery of video content via the Internet.

QoE metrics may include any number of individual measures, such as packet delivery latencies, error rates, and/or measures of other system behaviors. Some QoE metrics may be weighted more heavily than others, and some may be included in an analysis while others may be excluded. Thresholds may be determined for any number of QoE metrics to indicate whether certain changes should be made in the user device or the content distribution network. A quality scoring framework, as described herein, may be used by the user device, by the content distribution network, or both, to derive a first quality score for a first content segment. The first quality score may be used by the user device and/or the content distribution network to improve the quality of delivered content. The quality scoring framework, as well as the determined thresholds, may be static or dynamic and may change at various times or upon certain events.

A video viewing quality scoring ("VVQS") method may be used to determine a quality score for a content segment. The content segment may be a portion of a content item (e.g., a duration of the content item), a number of packets of data relating to the content item, a chapter/scene of the content item, and the like. The VVQS method may factor in many video playback artifacts for computing a VVQS based on one or more QoE metrics. Quality scoring may be performed using the VVQS method anytime during output, or at the end of output, of delivered content. Quality scoring may be performed by an end-user device, such as a set-top box, mobile device, or the like, or by a component/device of the content delivery network (e.g., an upstream device). The VVQS method may be applicable to Internet Protocol ("IP") linear video, time-shifted video, VOD streams, and the like.

When network usage is high, output of content segments at user devices may be associated with a lower QoE due to bandwidth bottlenecks, deployment schemes, and other network-related constraints. The QoE at user devices may be similarly constrained by resource availability, such as processing resources, as well as by external sources of interference, such as radio frequency interference. The content distribution network may instruct the user device, or the user device may determine without receiving such an instruction, of methods/processes by which the user device may improve the QoE metrics associated with output of a content segment by adjusting one or more output parameters using the methods described in greater detail below. The first quality score may also be used by the content distribution network to determine methods/processes by which network-related parameters and constraints may be managed, as further described herein, in order to improve the quality of delivered content.

To assess whether the quality of the delivered content improved after adjustments made by the user device and/or the content distribution network, the content distribution network may deliver a second content segment to the user device. A second quality score for the second content segment may be determined by the user device or by the content distribution network and the second quality score may be compared to the first quality score. If the second quality score is greater than the first quality score, then the adjustments were successful and no further adjustments may be necessary. If the second quality score is less than or equal to the first quality score, then further adjustments may be necessary to improve the quality of the delivered content.

Turning now to FIG. 1, a system 100 for content scoring and delivery is described. Those skilled in the art will appreciate that digital equipment and/or analog equipment may be employed. One skilled in the art will appreciate that provided herein is a functional description and that the respective functions may be performed by software, hardware, or a combination of software and hardware. The system 100 may have a central location 101 (e.g., a headend), which may receive content (e.g., data, input programming, and the like) from multiple sources. The central location 101 may combine the content from the various sources and may distribute the content to user (e.g., subscriber) locations (e.g., a user location 119) via a network 116 (e.g., content distribution and/or access system).

The central location 101 may receive content from a variety of input sources 102a, 102b, and 102c. Each of the input sources 102a, 102b, and 102c may be a datacenter having one or more packaging devices, transcoding devices, and content quality devices. The content may be sent from any of the input sources 102a, 102b, or 102c to the central location 101 via a variety of transmission paths, including wireless paths (e.g., satellite paths 103a, 103b) and terrestrial paths 104. The central location 101 may also receive content from an input source 106 via a direct line 105 (e.g., one or more communication links and/or one or more communication paths). Other input sources may be capture devices such as a video camera 109 or a server 110. The content sent by the content sources may comprise a single content item, a portion of a content item (e.g., content fragments), a content stream, a multiplex that includes several content items, and/or the like.

The central location 101 may have one or a plurality of receivers 111a, 111b, 111c, 111d that are associated with one or more corresponding input sources. The central location 101 may comprise one or more encoders 112, switches 113, multiplexers 114, and/or the like. An encoder 112 may compress, encrypt, transform, and/or otherwise encode content. The encoder 112 may encode content based on one or more compression standards, such as MPEG. The encoder may receive content from the video camera 109 and/or other source and apply one or more encoding algorithms to the received content. A switch 113 may provide access to a server 110, which may be a Pay-Per-View server, a data server, an internet router, a network system, a phone system, and the like. Some signals may require additional processing, such as signal multiplexing, prior to being modulated. Such multiplexing may be performed by a multiplexer 114.

The central location 101 may comprise one or more modulators 115 for interfacing with a network 116. A modulator may receive content from a receiver 111, encoder 112, multiplexer 114, and/or the like. A modulator 115 may convert the received content into a modulated output signal suitable for transmission over the network 116. A modulator 115 may map portions of the content to data bits expressed as signals (e.g., sinusoidal signals) at corresponding subcarrier frequencies of a data symbol. The output signals from the modulator 115 may be combined (e.g., packaged), using equipment such as a combiner 117 (e.g., a packaging device), for input into the network 116.

The network 116 may be a content distribution network, a content access network, and/or the like. The network 116 may be configured to send content from a variety of sources using a variety of network paths, protocols, devices, and/or the like. The content distribution network and/or content access network may be managed (e.g., deployed, serviced) by a content provider, a service provider, and/or the like. The network 116 may have a plurality of communication links connecting a plurality of devices. Content, or segments thereof, may be delivered by the network 116 using adaptive bitrate streaming. Content, or segments thereof, may be in HLS, DASH, or any other suitable streaming format. Content, or segments thereof, may be delivered by the network 116 to user devices along with classification metadata indicative of a quality classification for the content, or segments thereof, such as low quality, medium quality, or high quality. The quality classification for a given content item or content segment may be determined based on existing adaptive bitrate streaming approaches known in the art, or it may simply be based on a bitrate associated the content item or content segment.

A control system 118 may permit a system operator to control and monitor the functions and performance of system 100. The control system 118 may interface, monitor, and/or control a variety of functions, including, but not limited to, the channel lineup for a television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a user location 119.

The network 116 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

A multitude of users may be connected to the network 116. At the user location 119, a media device 120 may demodulate and/or decode, if needed, the signals for display on a display device 121, such as on a television set (TV) or a computer monitor. The media device 120 may be a demodulator, decoder, frequency tuner, and/or the like. The media device 120 may be directly connected to the network 116 (e.g., for communications via in-band and/or out-of-band signals of a content delivery network) and/or connected to the network 116 via a communication terminal 122 ("CT") (e.g., for communications via a packet switched network). The media device 120 may be a set-top box, a digital streaming device, a gaming device, a media storage device, a digital recording device, a computing device, a mobile computing device (e.g., a laptop, a smartphone, a tablet, etc.), a combination thereof, and/or the like. The media device 120 may implement one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. The communication terminal 122, for a cable network, may be configured to provide network access via a variety of communication protocols and standards, such as Data Over Cable Service Interface Specification (DOCSIS).

A first access point 123 (e.g., a wireless access point) may be located at the user location 119. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 may not necessarily be fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park, etc.).

The system 100 may have an application server 126. The application server 126 may provide services related to applications. The application server 126 may have an application store. The application store may be configured to allow users to purchase, download, install, upgrade, and/or otherwise manage applications. The application server 126 may be configured to allow users to download applications to a device, such as the mobile device 124, communications terminal 122, the media device 120, the display device 121, and/or the like. The application server 126 may run one or more application services to send data, handle requests, and/or otherwise facilitate operation of applications for the user.

The system 100 may have one or more content sources 127. The content source 127 may be configured to send content (e.g., video, audio, games, applications, data) to the user. The content source 127 may be configured to send streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to send the content via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

The system 100 may have an edge device 128. The edge device 128 may be configured to provide content, services, and/or the like to the user location 119. The edge device 128 may be one of a plurality of edge devices distributed across the network 116. The edge device 128 may be located in a region proximate to the user location 119. A request for content from the user may be directed to the edge device 128 (e.g., due to the location of the edge device and/or network conditions). The edge device 128 may be configured to receive packaged content (e.g., from the central location 101 and/or any of the input sources 102a, 102b, or 102c) for delivery to the user, convert content for delivery to the user (e.g., in a specific format requested by a user device), send the user a manifest file (e.g., or other index file describing portions of the content), send streaming content (e.g., unicast, multicast), provide a file transfer, and/or the like. The edge device 128 may cache or otherwise store content (e.g., frequently requested content) to enable faster delivery of content to users.

The edge device 128 may receive a request for content from the user location 119. The edge device 128 may receive a request for content from a client device (e.g., the media device 120, the communication terminal 122, etc.). The edge device 128 may establish a communication link with the client device. The edge device 128 may determine whether the edge device 128 has access to the requested content. The edge device 128 may determine whether the edge device 128 has access to the requested content after receiving the request for content from the client device. The edge device 128 may determine whether a cache associated with the edge device 128 has the requested content (e.g., a mid-tier cache, such as the central location 101). If the edge device 128 does not have access to the requested content, the edge device 128 may request the requested content from the central location 101, a different edge device 128 and/or the content source 127.

The edge device 128 may establish a communication link with the central location 101, a different edge device 128 and/or the content source 127 to receive the requested content. The edge device 128 may track the content received from the central location 101, a different edge device 128 and/or the content source 127. The control system 118 may determine that the central location 101 does not have access to the requested content. The control system 118 may establish a communication link with input source 102a (e.g., based on the request for the content). The input source 102a may send a redirect message to the control system 118 indicating that the requested content is available from input source 102b. The central location may receive the requested content from input source 102b and provide the requested content to the edge device 128 for delivery to the user. The network 116 may have a network component 129. The network component 129 may be any device, module, and/or the like communicatively coupled to the network 116. The network component 129 may be a router, a switch, a splitter, a packager, a gateway, an encoder, a storage device, a multiplexer, a network access location (e.g., tap), physical link, and/or the like.

The VVQS method described herein, and/or any of the other quality scoring methods described herein, may be implemented at a device of the system 100, such as any one of the media device 120, the mobile device 124, the application server 126, the content source 127, the edge device 128, or the network component 129. A quality score determined using the VVQS method may be a numerical value. For example, the quality score may be equal to 100 minus the sum of one or more impact values associated with a playback quality of a content segment. The content segment may be a portion of a content item (e.g., a duration of the content item), a number of packets of data relating to the content item, a chapter/scene of the content item, and the like. The quality score may be assigned a score of 100 when the sum of the one or more impact values is greater than or equal to 100. The quality score may be assigned a score of 0 when the sum of the one or more impact values is less than or equal to 0 (e.g., the quality score may not be assigned a negative value). As those skilled in the art can appreciate, a high quality score may be associated with a high overall QoE for a user. Conversely, a low quality score may be associated with a low overall QoE for a user. The quality score can be determined using all, or as few as one, of the one or more impact values. The one or more impact values may include one or more constant values (e.g., coefficients) and one or more variable values. The one or more constant values may be system-defined or user-defined. In cases where the one or more constant values are system-defined, the values may be initially set heuristically (e.g., assigned based on historical trends), and the values may then be fine-tuned based on feedback data provided by user devices and/or the upstream device. For example, a comparison of scores generated using the VVQS method for a given content segment may be compared to Mean Opinion Score (MOS) values provided by various user devices under a range of video playback scenarios (e.g., varying bandwidth, processing resource availability, etc.). The MOS values may also be available in public databases known in the art.

In cases where the one or more constant values are user-defined, the values may be based on a user profile. For example, a user may indicate via a user profile that the user prefers continuous playback of content, regardless of quality level, rather than pauses during playback of content for buffering, etc. As another example, the user may indicate via the user profile that the user prefers playback of highest-quality content segments, regardless of breaks in playback due to buffering, etc.

The upstream device may implement the VVQS method and determine an impact value associated with playback of low-quality video, which may be equal to $$A1 * \frac{m1}{n1}.$$

A value for A1 may represent a constant value indicative of an impact of low-quality video during playback. A value for m1 may be a total amount of time (e.g., seconds, minutes, etc.) of low-quality video playback. A value for n1 may be a total amount of time (e.g., seconds, minutes, etc.) of video playback (e.g., playback of all video, irrespective of quality level).

The upstream device may determine an impact value associated with playback of medium-quality video, which may be equal to $$A2 * \frac{m2}{n1}.$$

A value for A2 may represent a constant value indicative of an impact of medium-quality video during playback. A value for m2 may be a total amount of time (e.g., seconds, minutes, etc.) of medium-quality video playback. A value for n1 may be a total amount of time (e.g., seconds, minutes, etc.) of video playback (e.g., playback of all video, irrespective of quality level).

The upstream device may determine an impact value associated with continuous playback of low-quality video, which may be based on a duration of playback time of a low-quality content segment(s) prior to switching playback to either a medium-quality content segment(s) or an optimal (e.g., highest) quality content segment(s). The impact value associated with continuous playback of low-quality video may be equal to $\Sigma_{l=0}^{m3} A3 * e^{A4 * t(l)}$. A value for A3 may represent a constant value indicative of an impact of continuous playback of low-quality video. A value for A4 may represent an exponential constant value indicative of an impact of continuous playback of low-quality video. The value for A4 may be less than 1. A value for t(l) may be a total amount of time (e.g., seconds, minutes, etc.) of continuous playback of low-quality video. A value for l may range between 0 and a value for m3. The value for m3 may be a number of playback events associated with continuous playback of low-quality video.

The upstream device may determine an impact value associated with continuous playback of medium-quality video, which may be based on a duration of playback time of a medium-quality content segment(s) prior to switching playback to an optimal (e.g., highest) quality content segment(s) or to low quality content segment(s). The impact value associated with continuous playback of medium-quality video may be equal to $\Sigma_{l=0}^{m5} A5*e^{A6*t(m)}$. A value for A5 may represent a constant value indicative of an impact of continuous playback of medium-quality video. A value for A6 may represent an exponential constant value indicative of an impact of continuous playback of medium-quality video. The value for A6 may be less than 1. A value for t(m) may be a total amount of time (e.g., seconds, minutes, etc.) of continuous playback of medium-quality video. A value for l may range between 0 and a value for m5. The value for m5 may be a number of playback events associated with continuous playback of medium-quality video.

The upstream device may determine an impact value associated with an impact of a user device switching (e.g., downshifting) from playback of video that is greater than low-quality video to playback of low-quality video. The impact value for downshifting to low-quality video may consider a peak downshift frequency (e.g., a greatest number of downshifts occurring during a given time interval) as well as an amount of downshift occurrences. The impact value for downshifting to low-quality video may be equal to $A7*m7+\Sigma_{l=0}^{m4} Cd1$. A value for A7 may represent a constant value indicative of an impact of downshifting playback to low-quality video. A value for m7 may represent the peak downshift frequency (e.g., a greatest number of downshifts occurring during a given time interval). A value for m4 may be a total number of occurrences of downshifting playback to low-quality video. A value for Cd1 may represent a constant value indicative of an impact to the resulting quality score (e.g., a number between 0 and 100) based on a downshift of playback to low-quality video during playback of the entire corresponding content segment.

The upstream device may determine an impact value associated with an impact of a user device switching (e.g., downshifting) from playback of video that is greater than medium-quality video to playback of medium-quality video. The impact value for downshifting to medium-quality video may consider a peak downshift frequency (e.g., a greatest number of downshifts occurring during a given time interval) as well as an amount of downshift occurrences. The impact value for downshifting to medium-quality video may be equal to $A8*m8+\Sigma_{l=0}^{m6} Cd2$. A value for A8 may represent a constant value indicative of an impact of downshifting playback to medium-quality video. A value for m8 may represent the peak downshift frequency (e.g., a greatest number of downshifts occurring during a given time interval). A value for m6 may be a total number of occurrences of downshifting playback to medium-quality video. A value for Cd2 may represent a constant value indicative of an impact to the resulting quality score (e.g., a number between 0 and 100) based on a downshift of playback to medium-quality video during playback of the entire corresponding content segment.

The upstream device may determine an impact value associated with a user, via a user device, pausing playback of a content segment in order to allow the user device to re-buffer the content segment prior to the user device resuming playback of the content segment. The impact value for causing the user device to re-buffer the content segment may be equal to $\Sigma_{p=0}^{m9} A9*e^{A10*t(p)}$. A value for A9 may represent a constant value indicative of an impact of pausing playback of content to allow the user device to re-buffer the content segment. A value for A10 may represent an exponential constant value indicative of an impact of pausing playback of content to allow the user device to re-buffer the content segment. The value for A10 may be less than 1. A value for t(p) may be a total amount of time (e.g., seconds, minutes, etc.) playback is paused to allow the user device to re-buffer the content segment. A value for p may range between 0 and a value for m9. The value for m9 may be a number of re-buffering events (e.g., a number of times the user device pauses playback and re-buffers the content segment).

The upstream device may determine an impact value associated with a number of occurrences that a user device pauses playback of a content segment in order to allow the user device to re-buffer the content segment prior to the user device resuming playback of the content segment. This impact value may be equal to $A11*m11$. A value for A11 may represent a constant value indicative of an impact the user device causes when pausing playback of the content segment in order to allow the user device to re-buffer the content segment. A value for m11 may represent a peak re-buffering frequency (e.g., a greatest number of re-buffering events occurring during a given time interval).

The upstream device may determine an impact value associated with an overall impact of a user device pausing playback of a content segment in order to allow the user device to re-buffer the content segment prior to the user device resuming playback of the content segment. This impact value may be equal to $$A12*\frac{m12}{n1}.$$

A value for A12 may represent a constant value indicative of an overall impact of the user device pausing playback of the content segment in order to allow the user device to re-buffer the content segment. A value for m12 may be a total amount of time (e.g., seconds, minutes, etc.) playback is paused to allow the user device to re-buffer the content segment. A value for n1 may be a total amount of time (e.g., seconds, minutes, etc.) of video playback.

The upstream device may determine an impact value for a last-low quality video event, which may be based on lengths of time intervals between video events, such as a playback of less-than-optimal video quality, a temporary downshift to a lower-quality, a re-buffering event, a combination thereof, and/or the like. The impact value for a last-low quality video event may be equal to $\Sigma_{k=0}^{m10} C1 + A14*\log_{m11} t(k)/A15$. A value for C1 may represent a constant value indicative of an impact associated with a user experiencing a given low-quality video event (e.g., a downshift, re-buffering, etc.). A value for A14 may represent a constant value indicative of an impact associated with the user experiencing the given low-quality video event. For example, when the given low-quality video event is playback of less-than-optimal video quality, the value for A14 may be equal to a value of A1, A2, A3, or A5. As another example, when the given low-quality video event is a re-buffering event, the value for A14 may be equal to a value of A7 or A8. As a further example, when the given low-quality video event is a temporary downshift to a lower-quality, the value for A14 may be equal to a value of A9, A11, or A12.

A value for m11 may represent a base value for C1 (e.g., a base value associated with the impact of the user experiencing the given low-quality video event). The value for C1 may range between 0 and 1. A value for t(k) may be a total amount of time (e.g., seconds, minutes, etc.) of playback that has elapsed since the occurrence of the given low-quality video event. The value for t(k) may range between 0 and a value for m10. The value for m10 may be a total number of occurrences of low-quality video events during playback of the content segment. A value for A15 may represent a time scale factor (e.g., a conversion value from seconds to minutes, vice-versa, etc.).

The upstream device may determine an impact value for a playback failure event, such as a user device being unable to playback a content segment due to inability to retrieve the content segment, inability to decode the content segment, corruption of the content segment, a combination thereof, and/or the like. The impact value for a playback failure event may be equal to A16, which may be a constant value indicative of an impact associated with a user experiencing a playback failure event.

The upstream device may determine an impact value for a startup time associated with a duration of time between a user device receiving a request for a content segment and a start of playback of the content segment. The impact value for the startup time may be equal to $A20*e^{A21*t(z)}$. A value for A20 may be a constant value indicative of an impact associated with a given duration of the startup time (e.g., based on a user's preferences with respect to an expected duration of the startup time). A value for A21 may represent an exponential constant value indicative of an impact of the given duration of the startup time. The value for A21 may be less than 1. A value for t(z) may be equal to the given duration of the startup time (e.g., an amount of seconds, minutes, etc.).

The upstream device may determine an impact value for a trick play latency, which may be associated with a user causing the user device to perform a trick play operation (e.g., rewinding, fast-forwarding, etc.) during playback of a content segment. The impact value for the trick play latency may be equal to $\Sigma_{p=0}^{m11} A22*e^{A23*t(w)}$. A value for A22 may be a constant value indicative of an impact associated with experiencing a trick play latency. A value for A23 may represent an exponential constant value indicative of an impact of experiencing the trick play latency. The value for A23 may be less than 1. A value for t(w) may be equal to a duration of time for the trick play latency (e.g., an amount of seconds, minutes, etc.). The value for p may range between 0 and a value for m11. The value for m11 may be a total number of trick play operations during playback of the content segment.

As discussed herein, the VVQS method may be implemented by a device of the system 100, such as any one of the media device 120, the mobile device 124, the application server 126, the content source 127, the edge device 128, or the network component 129. The device that implements the VVQS method may send one or more output metrics associated with output of a content segment(s) at a downstream device, such as the media device 120 or the mobile device 124, to an analytics engine resident at the device that implements the VVQS method or at an upstream device/component of the system 100. The content segment may be a portion of a content item (e.g., a duration of the content item), a number of packets of data relating to the content item, a chapter/scene of the content item, and the like. The one or more output metrics may be indicative of one or more terms of the VVQS method discussed herein (e.g., one or more impact values), such as a number of re-buffering events, a number of playback failures, a number of quality downshifts, a duration(s) of any quality downshift, a seek latency, etc. The analytics engine may include a scoring engine for determining a quality score associated output of the content segment(s) at the downstream device. The analytics engine may determine the quality score based on the one or more output metrics received; the one or more terms of the VVQS method discussed herein; attributes related to the content segment(s) itself, such as the quality level (e.g., low, medium, high, etc.) assigned to the content segment(s); a combination thereof, and/or the like.

The analytics engine may use the quality score to determine methods/processes by which network-related parameters and constraints may be managed in order to improve the quality of delivered content. The analytics engine may use the quality score to determine methods/processes by which the downstream device may improve the one or more output metrics associated with output of delivered content by adjusting one or more output parameters. The analytics engine may instruct the downstream device to adjust one or more of the output parameters. The one or more output parameters may include a bandwidth setting. The downstream device may adjust the bandwidth setting to allocate a greater amount of bandwidth for receiving content and a lower amount of bandwidth for other network-related tasks (e.g., firmware/software updates, application downloads; etc.). The one or more output parameters may include an amount of processing resources available for use by the downstream device. The downstream device may adjust the amount of processing resources available by closing one or more applications executing on the downstream device; adjusting an amount of energy consumed by the downstream device; a combination thereof, and/or the like.

Figure 2:
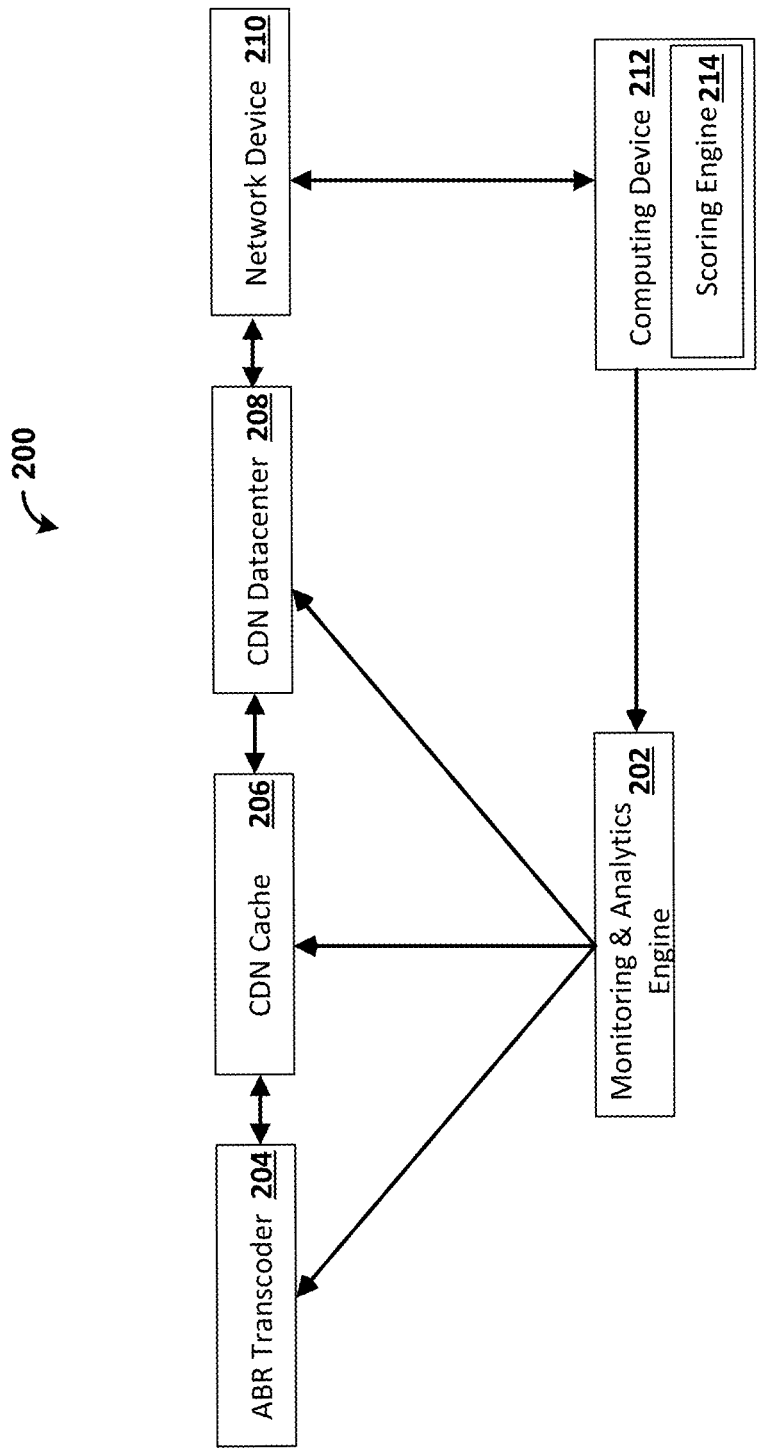
FIG. 2 shows an example system for delivering content.

FIG. 2 shows a system 200 for content scoring and delivery. The system 200 may receive a content segment(s) at an Adaptive Bitrate ("ABR") Transcoder 204 from a content source, such as any one of the input sources 102a, 102b, 102c, the application server 126, or the content source 127 of FIG. 1. The content segment(s) may be a portion of a content item (e.g., a duration of the content item), a number of packets of data relating to the content item, a chapter/scene of the content item, and the like. The content segment(s) may be sent to the ABR Transcoder 204 via a variety of transmission paths, including a wireless path (e.g., satellite paths 103a, 103b) and/or a terrestrial path (e.g., terrestrial path 104). The ABR Transcoder 204 may assign a quality level (e.g., low, medium, high, etc.) to the content segment(s) received from the content source. The ABR Transcoder 204, or other components of the system 200, may assign the quality level based on a bitrate of the content segment, capabilities of a display that is to present the content segment, a combination thereof, and/or the like. The system 200 may have a Content Distribution Network ("CDN") cache 206 (e.g., a mid-tier cache, such as the central location 101). The CDN cache 206 may receive the content segment(s) from the ABR Transcoder 204 and store the content segment(s) in a memory of the CDN cache 206. The CDN cache 206 may send the content segment(s) to a CDN Datacenter 208 (e.g., edge cache 128), which may in turn send the content segment(s) to a computing device 212 via a network device 210. The computing device 212 may be a user device such as the media device 120 or the mobile device 124. The computing device 212 may send requests for content via the network device 210 (e.g., the CT 122, the first access point 123, the second access point 124, and/or the network component 129). While not shown for ease of explanation, one skilled in the art can appreciate that the system 200 may have any number of ABR transcoders 204, CDN caches 206, CDN Datacenters 214, network devices 210, and computing devices 212.

The ABR Transcoder 204 may receive the content segment(s) based on a request sent by the computing device 212 to either of the CDN datacenter 208 or the CDN cache 206. The computing device 212 may include a scoring engine 214 for determining a quality score associated with the content segment(s) received via the network device 210. The computing device 212 may determine the quality score using the VVQS method described herein in a similar manner as the upstream device described in FIG. 1. The quality score may be based on one or more output metrics associated with output of the content segment(s). The one or more output metrics may be indicative of one or more terms of the VVQS method discussed herein (e.g., one or more impact values), such as a number of re-buffering events, a number of playback failures, a number of quality downshifts, a duration (s) of any quality downshift, a seek latency, etc. The quality score may also be based on attributes related to the content segment(s) itself, such as the quality level (e.g., low, medium, high, etc.) assigned to the content segment(s) by the ABR Transcoder 204.

The computing device 212 may use the quality score to determine methods/processes by which it may improve the one or more output metrics associated with output of delivered content by adjusting one or more output parameters. The one or more output parameters may include one or more of a bandwidth setting of the network device 210; an amount of processing resources available at the network device 210; a level of interference associated with the network device 210, a combination thereof, and/or the like.

The one or more output parameters may include a bandwidth setting of the network device 210. The computing device 212 may adjust the bandwidth setting to allocate a greater amount of bandwidth for receiving content and a lower amount of bandwidth for other network-related tasks (e.g., firmware/software updates, application downloads; etc.). The one or more output parameters may include an amount of processing resources available for use by the computing device 212. The computing device 212 may adjust the amount of processing resources available by closing one or more applications executing on the computing device 212; adjusting an amount of energy consumed by the computing device 212; a combination thereof, and/or the like.

The one or more output parameters may include a level of interference associated with the network device 210 (e.g., radio frequency interference caused by an appliance; a heavily-trafficked wireless communications channel, etc.). Radio frequency interference may be associated with the CT 122, the first access point 123, the second access point 124, and/or the network component 129. For example, the computing device 212 may experience one or more output glitches (e.g., resulting from lost packets, bit errors, signal noise, etc.) while outputting (e.g., playing, streaming, etc.) a content segment. The content segment may become inaccessible or incur a reduction of output quality due to noise or bandwidth reduction. Such issues may be caused by a device unrelated to the output of the content segment, such as noise from a microwave or other electrical appliance, or from a bandwidth reduction caused by a large download initiated by another computing device in communication with the network device 210 (not shown).

Upon detecting/determining a source of interference, the computing device 212 may instruct a user device (e.g., via a user interface of the computing device 212) of methods/processes by which the source of interference may be eliminated (e.g., a suggestion to move one or both of the network device 210 or the computing device 212). The computing device 212 may adjust an amount of transmit power allocated to the network device 210. For example, an adjustment could include increasing a data transmission rate of the network device 210, increasing an amount of power of one or more amplifiers of the network device 210, and/or increasing a number of ports activated in the network device 210. As another example, an adjustment may be in the form of changing a utilization of the network device 210 by the computing device 212 instructing the network device 210 to change a current wireless communication channel. Computing device 212 may interact with an Internet-of-Things ("IOT") enabled device to confirm that the IOT device is a source of interference and to control operation of the IOT device (e.g., to enable signal quality to be improved). The IOT device may be, for example, a smart appliance, a television, a speaker, a combination thereof, and/or the like. The computing device 212 may indicate to the user a source of the signal interference. For example, the computing device 212 may indicate to the user that the source of the signal interference is actively causing the video QoE score to drop.

The quality score may be sent by the computing device 212 to a Monitoring and Analytics ("M&A") Engine 202 (e.g., an upstream device/component of the content distribution network). The M&A Engine 202 may be in communication with one or more of the ABR Transcoder 204, the CDN cache 206, or the CDN datacenter 208. The M&A Engine 202 may use the quality score to determine methods/processes by which network-related parameters and constraints may be managed in order to improve the quality of delivered content. For example, the quality score may be used by the M&A Engine 202 to identify issues associated with a deployment scheme used by the content distribution network. For example, a deployment scheme could be related to installation and configuration of new transcoders, network component changes and/or failures, a type of content distribution network, an upgrade of existing hardware and software, a combination thereof, and/or the like. A deployment scheme could also be related to an outage of a given DOCSIS channel and/or incorrect configuration. As another example, a low quality score may be due to peak usage of the content distribution network, and the M&A Engine 202 may instruct the ABR Transcoder 204 to generate a next content segment at an intermediate bitrate (e.g., medium-quality rather than best quality) based on an amount of available network bandwidth.

The ABR Transcoder 204 may deliver a next content segment to the computing device 212. The next content segment may be delivered based on adjustments made to the network-related parameters and constraints. For example, the next content segment may be delivered using an updated deployment scheme. As another example, the next content segment may be encoded by the ABR Transcoder 204 at a bitrate that is less than a bitrate of the initially-delivered content segment. The computing device 212 may determine a quality score for the next content segment that is indicative of a higher VVQ score and overall higher QoE level as compared to the VVQS and QoE level associated with the initially-delivered content segment.

Figure 3:
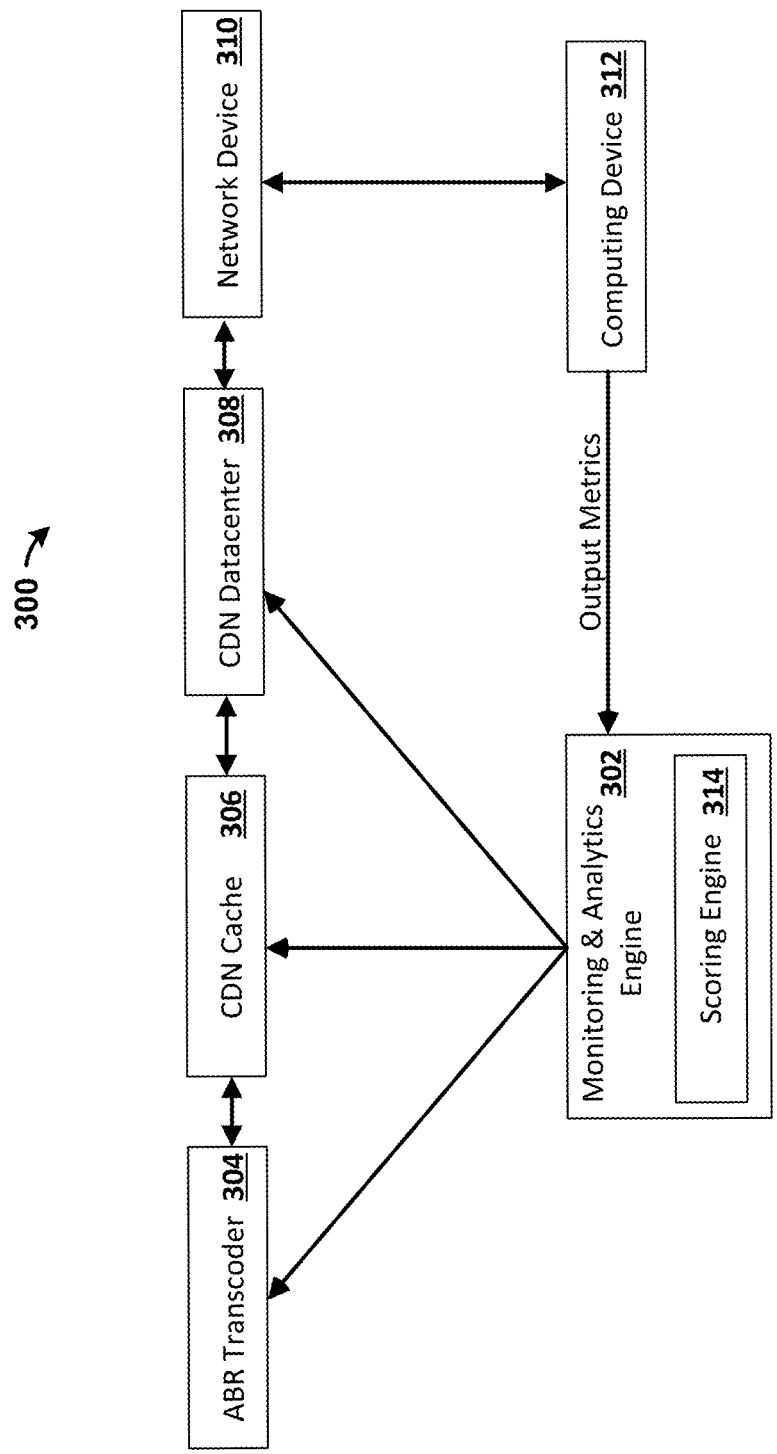
FIG. 3 shows an example system for delivering content.

FIG. 3 shows a system 300 for content scoring and delivery. The system 300 may receive a content segment(s) at an Adaptive Bitrate ("ABR") Transcoder 304 from a content source, such as any one of the input sources 102a, 102b, 102c, the application server 126, or the content source 127 of FIG. 1. The content segment(s) may be a portion of a content item (e.g., a duration of the content item), a number of packets of data relating to the content item, a chapter/scene of the content item, and the like. The content segment(s) may be sent to the ABR Transcoder 304 via a variety of transmission paths, including a wireless path (e.g., satellite paths 103a, 103b) and/or a terrestrial path (e.g., terrestrial path 104). The ABR Transcoder 304 may receive the content segment(s) based on a request sent by the computing device 312 to either of the CDN datacenter 308 or the CDN cache 306. The ABR Transcoder 304 may assign a quality level (e.g., low, medium, high, etc.) to the content segment(s) received from the content source. The ABR Transcoder 304, or other components of the system 300, may assign the quality level based on a bitrate of the content segment, capabilities of a display that is to present the content segment, a combination thereof, and/or the like. The system 300 may have a Content Distribution Network ("CDN") cache 306 (e.g., a mid-tier cache, such as the central location 101). The CDN cache 306 may receive the content segment(s) from the ABR Transcoder 304 and store the content segment(s) in a memory of the CDN cache 306. The CDN cache 306 may send the content segment(s) to a CDN Datacenter 308 (e.g., edge cache 128), which may in turn send the content segment(s) to a computing device 312 via a network device 310. The computing device 312 may be a user device such as the media device 120 or the mobile device 124. The computing device 312 may send requests for content via the network device 310 (e.g., the CT 122, the first access point 123, the second access point 124, and/or the network component 129). The system 300 may include a Monitoring and Analytics ("M&A") Engine 302 (e.g., an upstream device/component of the content distribution network). The M&A Engine 302 may be in communication with one or more of the ABR Transcoder 304, the CDN cache 306, or the CDN datacenter 308. While not shown for ease of explanation, one skilled in the art can appreciate that the system 300 may have any number of ABR transcoders 304, CDN caches 306, CDN Datacenters 314, network devices 310, and computing devices 312.

The computing device 312 may send one or more output metrics associated with output of the content segment(s) at the computing device 312 to the M&A Engine 302. The one or more output metrics may be indicative of one or more terms of the VVQS method discussed herein, such as a number of re-buffering events, a number of playback failures, a number of quality downshifts, a duration(s) of any quality downshift, a seek latency, etc. The M&A Engine 302 may include a scoring engine 314 for determining a quality score associated output of the content segment(s) at the computing device 312. The M&A Engine 302 may determine the quality score based on the one or more output metrics received via the computing device 312; the VVQS method discussed herein (e.g., as described with respect to the computing device 212 of FIG. 2); the methods discussed below; attributes related to the content segment(s) itself, such as the quality level (e.g., low, medium, high, etc.) assigned to the content segment(s) by the ABR Transcoder 304; a combination thereof, and/or the like.

The M&A Engine 302 may use the quality score to determine methods/processes by which network-related parameters and constraints may be managed in order to improve the quality of delivered content. The M&A Engine 302 may use the quality score to determine methods/processes by which the computing device 312 may improve the one or more output metrics associated with output of delivered content by adjusting one or more output parameters. The M&A Engine 302 may instruct the computing device 312 to adjust the one or more output parameters.

The one or more output parameters may include one or more of a bandwidth setting; an amount of processing resources; a level of interference, a combination thereof, and/or the like. For example, the one or more output parameters may include a bandwidth setting of the network device 310. The computing device 312 may adjust (e.g., in response to receiving an instruction from the M&A Engine 302) the bandwidth setting to allocate a greater amount of bandwidth for receiving content and a lower amount of bandwidth for other network-related tasks (e.g., firmware/software updates, application downloads; etc.). As another example, the one or more output parameters may include an amount of processing resources available for use by the computing device 312. The computing device 312 may adjust (e.g., in response to receiving an instruction from the M&A Engine 302) the amount of processing resources available by closing one or more applications executing on the computing device 212; adjusting an amount of energy consumed by the computing device 212; a combination thereof, and/or the like. As a further example, the one or more output parameters may include a level of interference associated with the network device 310 (e.g., radio frequency interference caused by an appliance; a heavily-trafficked wireless communications channel, etc.). Radio frequency interference may be associated with the CT 122, the first access point 123, the second access point 124, and/or the network component 129. For example, the computing device 312 may experience one or more output glitches (e.g., resulting from lost packets, bit errors, signal noise, etc.) while outputting (e.g., playing, streaming, etc.) a content segment. The content segment may become inaccessible or incur a reduction of output quality due to noise or bandwidth reduction. Such issues may be caused by a device (not shown) unrelated to the output of the content segment, such as noise from a microwave or other electrical appliance, or from a bandwidth reduction caused by a large download initiated by another computing device in communication with the network device 310.

Upon detecting/determining a source of interference, the computing device 312 may instruct a user device (e.g., via a message displayed at, or sent to, a user interface of the computing device 312) of methods/processes by which the source of interference may be eliminated (e.g., a suggestion to move one or both of the network device 210 or the computing device 312). The computing device 312 may adjust an amount of transmit power allocated to the network device 310. The computing device 312 may adjust the amount of transmit power allocated to the network device 310 based on an instruction received from the M&A Engine 302. For example, the instruction received from the M&A Engine 302 may cause the computing device 312 to increase a data transmission rate of the network device 310, increase an amount of power of one or more amplifiers of the network device 310, and/or increase a number of ports activated in the network device 310. As another example, the instruction received from the M&A Engine 302 may cause the computing device 312 to change a utilization of the network device 310 by the computing device 312 instructing the network device 310 to change a current wireless communication channel.

The quality score may be used by the M&A Engine 302 to identify issues associated with a deployment scheme used by the content distribution network. (e.g., an outage of a given DOCSIS channel and/or incorrect configuration). As another example, a low quality score may be due to peak usage of the content distribution network, and the M&A Engine 302 may instruct the ABR Transcoder 304 to generate a next content segment at an intermediate bitrate (e.g., medium-quality rather than best quality) based on an amount of available network bandwidth.

The ABR Transcoder 304 may deliver a next content segment to the computing device 312. The next content segment may be delivered based on adjustments made to the network-related parameters and constraints. For example, the next content segment may be delivered using an updated deployment scheme. As another example, the next content segment may be encoded by the ABR Transcoder 304 at a bitrate that is less than a bitrate of the initially-delivered content segment. The computing device 312 may determine a quality score for the next content segment that is indicative of a higher VVQS and overall higher QoE level as compared to the VVQS and QoE level associated with the initially-delivered content segment.

Figure 4:
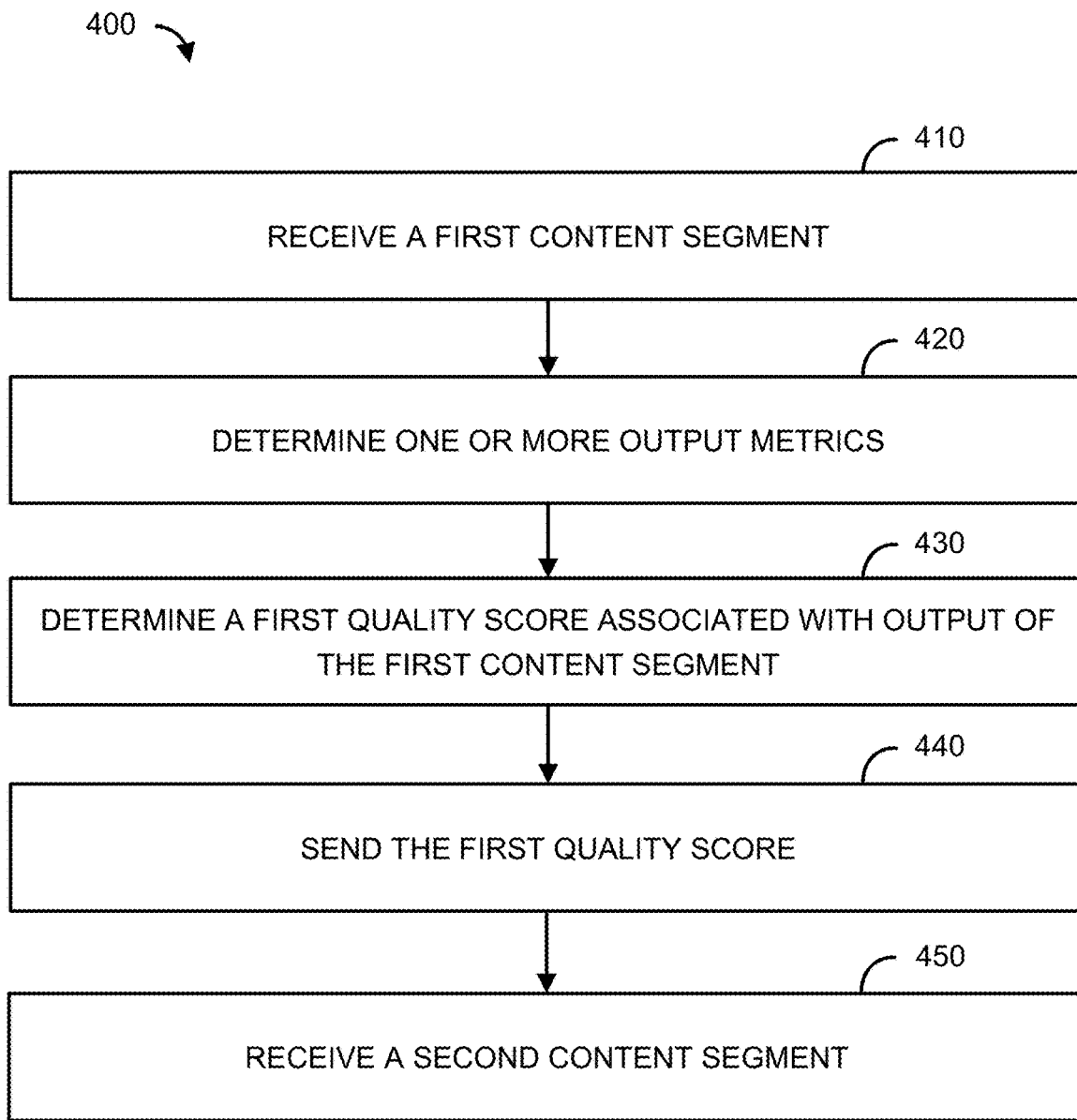
FIG. 4 shows a flowchart of an example method for content scoring and delivery.

FIG. 4 is a flowchart of a method 400 for content scoring and delivery in accordance with the present description. Method 400 may be implemented using the system 100 of FIG. 1, the system 200 of FIG. 2, and/or the system 300 of FIG. 3. At step 410, a first content segment for a content item may be received. The first content segment may be a portion of a content item (e.g., a duration of the content item), a number of packets of data relating to the content item, a chapter/scene of the content item, and the like. The first content segment may be received by a user device, such as the media device 120, the mobile device 124, or any other user device described herein. The first content segment may be received with associated classification metadata. The classification metadata may be appended to the first content segment by a transcoder, such as the ABR Transcoder 204 of FIG. 2 or the ABR Transcoder 304 of FIG. 3. For example, a transcoder may receive the first content segment from a content source and assign a quality level (e.g., low, medium, high, etc.) to the first content segment. The assigned quality level may be indicated by the classification metadata.

At step 420, one or more output metrics may be determined. The one or more output metrics may be based on the classification metadata. Each of the one or more output metrics may be, for example, a duration of playback of the content item at the quality level associated with the first content segment; an amount of quality downshifts; a frequency of the quality downshifts; a playback failure; a seek latency; an amount of time associated with buffering the first content segment; an amount of buffering events; a frequency of the buffering events; a combination thereof, and/or the like.

At step 430, a first quality score associated with output of the first content segment may be determined. The first quality score may be determined using the VVQS method described herein. The first quality score may be associated with a QoE level as described herein. The first quality score may be based on the one or more output metrics. The first quality score may be based on a comparison (e.g., by the user device) of the one or more output metrics to a corresponding benchmark value. The corresponding benchmark value may be based on various user devices operating under a range of video playback scenarios (e.g., varying bandwidth, processing resource availability, etc.). For example, an output metric may be a duration of time the user device outputs the content item (e.g., a content segment) at a low quality level, and the corresponding benchmark value may be a threshold duration of time (e.g., 30% of the content item's total duration in seconds) of outputting content at the low quality level. When the output metric indicates the duration of time the user device outputs the content item at the low quality level meets or exceeds the threshold duration of time, the user device may factor this comparison into the first quality score (e.g., it may be weighed more heavily in determining the first quality score).

As another example, based on one or more of the classification metadata or the one or more output metrics, at least one impact coefficient associated with output of the first content segment may be determined. The at least one impact coefficient may be a coefficient/factor/constant as described herein regarding the VVQS method. Based on the at least one impact coefficient and at least one of the one or more output metrics, the first quality score may be determined.

At step 440, the first quality score may be sent to a computing device. The computing device may be an upstream device/component of a content distribution network, such as the M&A Engine 202 or the M&A Engine 302. The computing device may be in communication with one or more of the transcoder, a CDN cache, or a CDN datacenter. The computing device may use the first quality score to determine methods/processes by which network-related parameters and constraints may be managed in order to improve the quality of delivered content. For example, the first quality score may be used by the computing device to identify issues associated with a deployment scheme used by the content distribution network and cause adjustments to be made accordingly. As another example, if the first quality score is a low value (e.g., indicative of poor QoE level), it may be due to peak usage of the content distribution network, and the computing device may instruct the transcoder to generate a next content segment at an intermediate bitrate (e.g., medium-quality rather than best quality) based on an amount of available network bandwidth associated with part, or all, of the content distribution network. The computing device may also cause an auxiliary cache (e.g., a CDN cache, a CDN datacenter, etc.) to provide further content segments of the content item.

At step 450, a second content segment may be received (e.g., at the user device). The second content segment may be a further portion of the content item (e.g., a duration of the content item), a number of packets of data relating to the content item, a chapter/scene of the content item, and the like. The second content segment may be received based on (e.g., in response to) sending the first quality score. The second content segment may be associated with the quality level associated with the first content segment (e.g., a same bitrate as that of the first content segment). The second content segment may be associated with a quality level that differs from the quality level associated with the first content segment. For example, the classification metadata of the first content segment may indicate that the first content segment was assigned a "high" quality level by the transcoder, and classification metadata of the second content segment may indicate that the second content segment was assigned a "medium" quality level by the transcoder. Based on the classification metadata of the second content segment and one or more further output metrics associated with output of the second content segment, a second quality score may be determined (e.g., by the user device). The second quality score may have a greater value than the first quality score. The second quality score may be sent to the computing device along with an indication of an amount of available bandwidth and/or processing resources available at the user device. The computing device may generate a third content segment based on the indicated amount of available bandwidth and/or processing resources. The third content segment may be a further portion of the content item (e.g., a duration of the content item), a number of packets of data relating to the content item, a chapter/scene of the content item, and the like.

The third content segment may be associated with a quality level that differs from one or more of the quality level associated with the first content segment or the quality level associated with the second content segment. For example, the classification metadata of the first content segment may indicate that the first content segment was assigned a "high" quality level by the transcoder, and the classification metadata of the second content segment may indicate that the second content segment was assigned a "medium" quality level by the transcoder. The third content segment may have classification metadata indicating that the transcoder assigned a "high" quality level to the third content segment. The amount of available bandwidth and/or processing resources at the user device may be improved by the user device making one or more adjustments to one or more output parameters in response to the first quality score having a low value.

As an example, adjusting the one or more output parameters may include the user device adjusting a bandwidth setting of a gateway device, such as the network device 210 or 310, and/or determining a source of interference associated with the gateway device (e.g., radio frequency interference caused by an appliance; a heavily-trafficked wireless communications channel, etc.). Radio frequency interference may be associated with the gateway device and one or more of a communications terminal, such as CT 122; a first access point, such as the first access point 123; a second access point, such as the second access point 124; and/or a network component, such as the network component 129. For example, the user device may experience one or more output glitches (e.g., resulting from lost packets, bit errors, signal noise, etc.) while outputting (e.g., playing, streaming, etc.) a given content segment. The given content segment may become inaccessible or incur a reduction of output quality due to noise or bandwidth reduction. Such issues may be caused by a device unrelated to the output of the content segment, such as noise from a microwave or other electrical appliance, or from a bandwidth reduction caused by a large download initiated by another computing device in communication with the gateway device.

Upon detecting/determining a source of interference, the user device may instruct a user device (e.g., via a message displayed at, or sent to, a user interface of the user device) of methods/processes by which the source of interference may be eliminated (e.g., a suggestion to move one or both of the gateway device or the user device). The user device may adjust an amount of transmit power allocated to the gateway device. For example, an adjustment could include increasing a data transmission rate of the gateway device, increasing an amount of power of one or more amplifiers of the gateway device, and/or increasing a number of ports activated in the gateway device. As another example, an adjustment may be in the form of changing a utilization of the gateway device by the user device instructing the gateway device to change a current wireless communication channel. The user device may adjust the one or more output parameters prior to sending the indication of the amount of available bandwidth and/or processing resources to the computing device.

Figure 5:
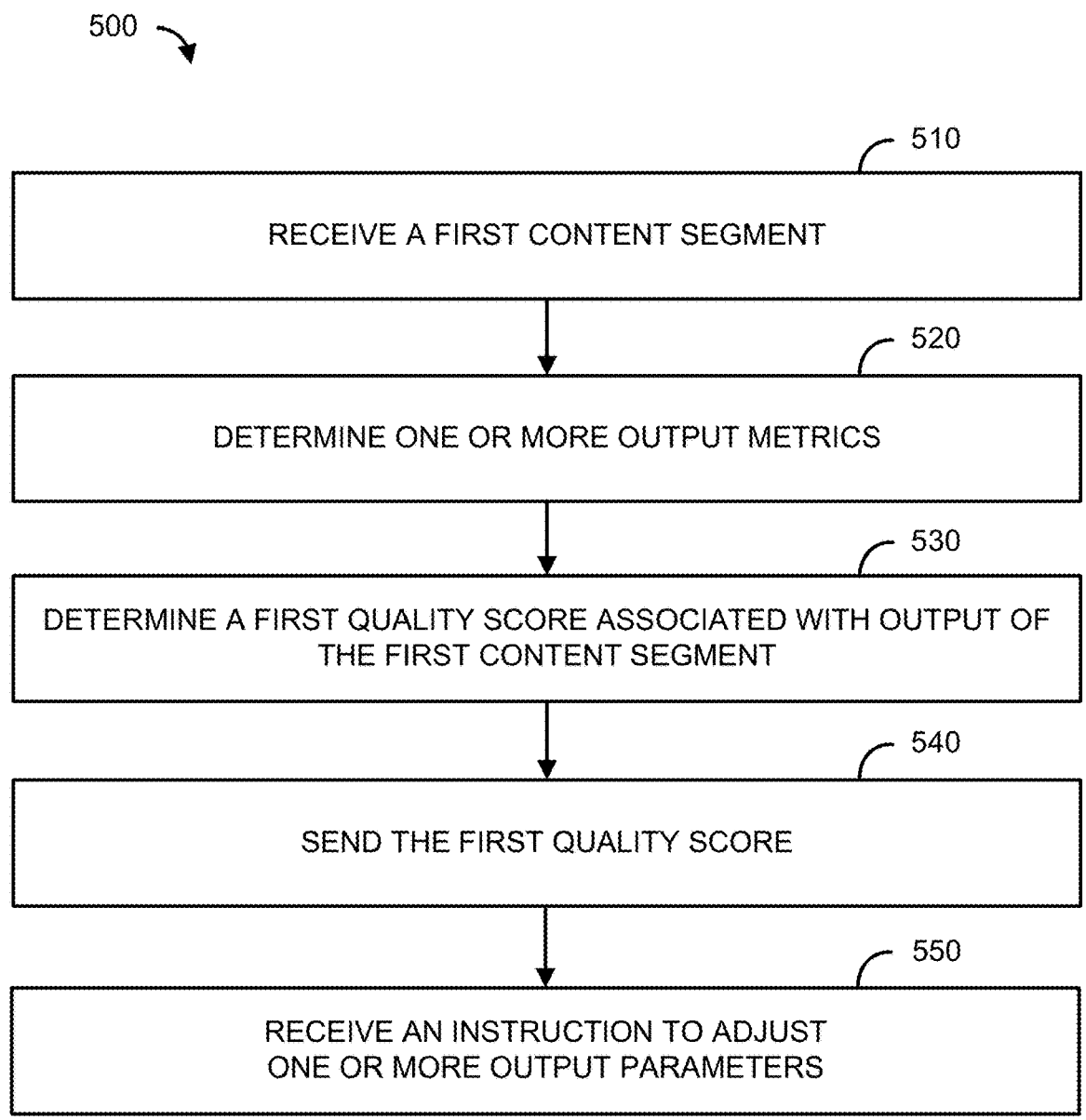
FIG. 5 shows a flowchart of an example method for content scoring and delivery.

FIG. 5 is a flowchart of a method 500 for content scoring and delivery in accordance with the present description. Method 500 may be implemented using the system 100 of FIG. 1, the system 200 of FIG. 2, and/or the system 300 of FIG. 3. At step 510, a first content segment for a content item may be received. The first content segment may be a portion of a content item (e.g., a duration of the content item), a number of packets of data relating to the content item, a chapter/scene of the content item, and the like. The first content segment may be received by a user device, such as the media device 120, the mobile device 124, or any other user device described herein. The first content segment may be received with associated classification metadata. The classification metadata may be appended to the first content segment by a transcoder, such as the ABR Transcoder 204 of FIG. 2 or the ABR Transcoder 304 of FIG. 3. For example, a transcoder may receive the first content segment from a content source and assign a quality level (e.g., low, medium, high, etc.) to the first content segment. The assigned quality level may be indicated by the classification metadata.

At step 520, one or more output metrics may be determined. The one or more output metrics may be based on the classification metadata. Each of the one or more output metrics may be, for example, a duration of playback of the content item at the quality level associated with the first content segment; an amount of quality downshifts; a frequency of the quality downshifts; a playback failure; a seek latency; an amount of time associated with buffering the first content segment; an amount of buffering events; a frequency of the buffering events; a combination thereof, and/or the like.

At step 530, a first quality score associated with output of the first content segment may be determined. The first quality score may be determined using the VVQS method described herein. The first quality score may be associated with a QoE level as described herein. The first quality score may be based on the one or more output metrics. The first quality score may be based on a comparison (e.g., by the user device) of the one or more output metrics to a corresponding benchmark value. The corresponding benchmark value may be based on various user devices operating under a range of video playback scenarios (e.g., varying bandwidth, processing resource availability, etc.). For example, an output metric may be a duration of time the user device outputs the content item (e.g., a content segment) at a low quality level, and the corresponding benchmark value may be a threshold duration of time (e.g., 30% of the content item's total duration in seconds) of outputting content at the low quality level. When the output metric indicates the duration of time the user device outputs the content item at the low quality level meets or exceeds the threshold duration of time, the user device may factor this comparison into the first quality score (e.g., it may be weighed more heavily in determining the first quality score).

As another example, based on one or more of the classification metadata or the one or more output metrics, at least one impact coefficient associated with output of the first content segment may be determined. The at least one impact coefficient may be a coefficient/factor/constant as described herein regarding the VVQS method. Based on the at least one impact coefficient and at least one of the one or more output metrics, the first quality score may be determined.

At step 540, the first quality score may be sent to a computing device. The computing device may be an upstream device/component of a content distribution network, such as the M&A Engine 202 or the M&A Engine 302. The computing device may be in communication with one or more of the transcoder, a CDN cache, or a CDN datacenter. The computing device may use the first quality score to determine methods/processes by which network-related parameters and constraints may be managed in order to improve the quality of delivered content. For example, the first quality score may be used by the computing device to identify issues associated with a deployment scheme used by the content distribution network and cause adjustments to be made accordingly. As another example, if the first quality score is a low value (e.g., indicative of poor QoE level), it may be due to peak usage of the content distribution network, and the computing device may instruct the transcoder to generate a next content segment at an intermediate bitrate (e.g., medium-quality rather than best quality) based on an amount of available network bandwidth associated with part, or all, of the content distribution network. The computing device may also cause an auxiliary cache (e.g., a CDN cache, a CDN datacenter, etc.) to provide further content segments of the content item.

At step 550, an instruction to adjust one or more output parameters may be received (e.g., at the user device). The instruction may be received via the computing device in response to the computing device having received the first quality score (e.g., in response to sending the first quality score). The instruction may cause the user device to adjust the one or more output parameters by, for example, causing the user device to adjust a bandwidth setting of a gateway device, such as the network device 210 or 310, and/or determining a source of interference associated with the gateway device (e.g., radio frequency interference caused by an appliance; a heavily-trafficked wireless communications channel, etc.). Radio frequency interference may be associated with the gateway device and one or more of a communications terminal, such as CT 122; a first access point, such as the first access point 123; a second access point, such as the second access point 124; and/or a network component, such as the network component 129. For example, the user device may experience one or more output glitches (e.g., resulting from lost packets, bit errors, signal noise, etc.) while outputting (e.g., playing, streaming, etc.) a given content segment. The given content segment may become inaccessible or incur a reduction of output quality due to noise or bandwidth reduction. Such issues may be caused by a device unrelated to the output of the content segment, such as noise from a microwave or other electrical appliance, or from a bandwidth reduction caused by a large download initiated by another computing device in communication with the gateway device.

Upon detecting/determining a source of interference, the user device may instruct a user device (e.g., via a message displayed at, or sent to, a user interface of the user device) of methods/processes by which the source of interference may be eliminated (e.g., a suggestion to move one or both of the gateway device or the user device). The user device may adjust an amount of transmit power allocated to the gateway device. For example, an adjustment could include increasing a data transmission rate of the gateway device, increasing an amount of power of one or more amplifiers of the gateway device, and/or increasing a number of ports activated in the gateway device. As another example, the instruction may cause the user device to instruct the gateway device to change a current wireless communication channel. The user device may be caused to adjust the one or more output parameters prior to sending an indication of an amount of available bandwidth and/or processing resources to the computing device.

A second content segment may be received (e.g., at the user device). The second content segment may be a further portion of the content item (e.g., a duration of the content item), a number of packets of data relating to the content item, a chapter/scene of the content item, and the like. The second content segment may be associated with the quality level associated with the first content segment (e.g., a same bitrate as that of the first content segment). The second content segment may be associated with a quality level that differs from the quality level associated with the first content segment. For example, the classification metadata of the first content segment may indicate that the first content segment was assigned a "high" quality level by the transcoder, and classification metadata of the second content segment may indicate that the second content segment was assigned a "medium" quality level by the transcoder. Based on the classification metadata of the second content segment and one or more further output metrics associated with output of the second content segment, a second quality score may be determined (e.g., by the user device). The second quality score may have a greater value than the first quality score. The second quality score may be sent to the computing device along with the indication of the amount of available bandwidth and/or processing resources available at the user device. The computing device may generate a third content segment based on the indicated amount of available bandwidth and/or processing resources. The third content segment may be a further portion of the content item (e.g., a duration of the content item), a number of packets of data relating to the content item, a chapter/scene of the content item, and the like.

The third content segment may be associated with a quality level that differs from one or more of the quality level associated with the first content segment or the quality level associated with the second content segment. For example, the classification metadata of the first content segment may indicate that the first content segment was assigned a "high" quality level by the transcoder, and the classification metadata of the second content segment may indicate that the second content segment was assigned a "medium" quality level by the transcoder. The third content segment may have classification metadata indicating that the transcoder assigned a "high" quality level to the third content segment.

Figure 6:
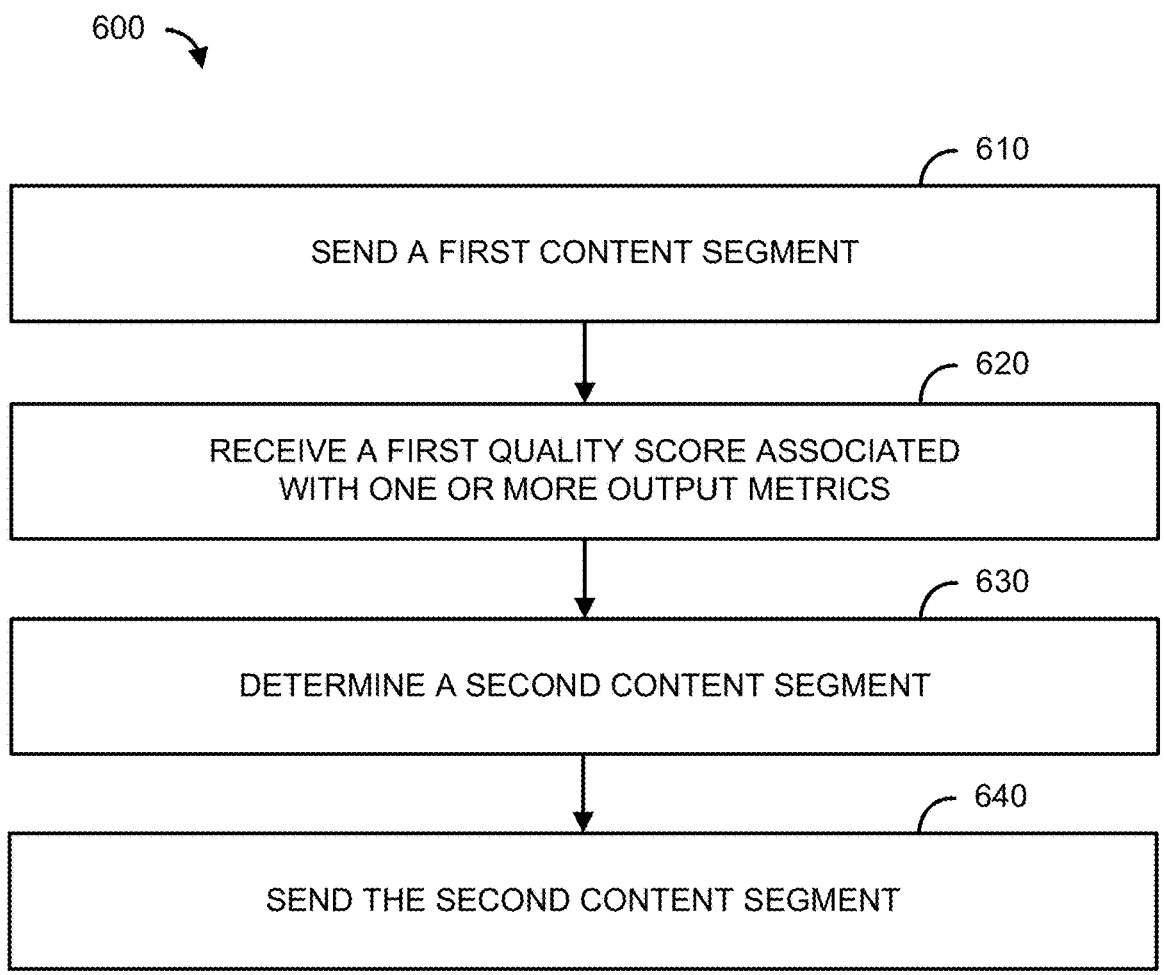
FIG. 6 shows a flowchart of an example method for content scoring and delivery.

FIG. 6 is a flowchart of a method 600 for content scoring and delivery in accordance with the present description. Method 600 may be implemented using the system 100 of FIG. 1, the system 200 of FIG. 2, and/or the system 300 of FIG. 3. At step 610, a first content segment for a content item may be sent to a first computing device. The first content segment may be a portion of a content item (e.g., a duration of the content item), a number of packets of data relating to the content item, a chapter/scene of the content item, and the like. The first content segment may be caused to be sent by an upstream device (e.g., component) of a content distribution network, such as the M&A Engine 202 or the M&A Engine 302. The upstream device may be in communication with one or more of a transcoder, a CDN cache, or a CDN datacenter. The first computing device may be a user device, such as the media device 120, the mobile device 124, or any other user device described herein. The first content segment may be sent with associated classification metadata. The classification metadata may be appended to the first content segment by the transcoder, such as the ABR Transcoder 204 of FIG. 2 or the ABR Transcoder 304 of FIG. 3. For example, the transcoder may receive the first content segment from a content source and assign a quality level (e.g., low, medium, high, etc.) to the first content segment. The assigned quality level may be indicated by the classification metadata.

The first computing device may determine one or more output metrics associated with output of the first content segment at the first computing device. The one or more output metrics may be based on the classification metadata. Each of the one or more output metrics may be, for example, a duration of playback of the content item at the quality level associated with the first content segment; an amount of quality downshifts; a frequency of the quality downshifts; a playback failure; a seek latency; an amount of time associated with buffering the first content segment; an amount of buffering events; a frequency of the buffering events; a combination thereof, and/or the like.

At step 620, a first quality score associated with output of the first content segment at the first computing device may be received via the first computing device. The first quality score may be determined by the first computing device using the VVQS method described herein. The first quality score may be associated with a QoE level as described herein. The first quality score may be based on the one or more output metrics. The first quality score may be based on a comparison (e.g., by the user device) of the one or more output metrics to a corresponding benchmark value. The corresponding benchmark value may be based on various user devices operating under a range of video playback scenarios (e.g., varying bandwidth, processing resource availability, etc.). For example, an output metric may be a duration of time the user device outputs the content item (e.g., a content segment) at a low quality level, and the corresponding benchmark value may be a threshold duration of time (e.g., 30% of the content item's total duration in seconds) of outputting content at the low quality level. When the output metric indicates the duration of time the user device outputs the content item at the low quality level meets or exceeds the threshold duration of time, the user device may factor this comparison into the first quality score (e.g., it may be weighed more heavily in determining the first quality score).

As another example, based on one or more of the classification metadata or the one or more output metrics, at least one impact coefficient associated with output of the first content segment may be determined. The at least one impact coefficient may be a coefficient/factor/constant as described herein regarding the VVQS method. Based on the at least one impact coefficient and at least one of the one or more output metrics, the first quality score may be determined.

At step 630 a second content segment may be determined. The second content segment may be a further portion of the content item (e.g., a duration of the content item), a number of packets of data relating to the content item, a chapter/scene of the content item, and the like. The second content segment may be determined (e.g., selected) by the upstream device. The upstream device may determine (e.g., select) the second content segment based on the first quality score not meeting a quality threshold (e.g., a value of the first quality score may be less than a value of the quality threshold). The upstream device may use the first quality score to determine methods/processes by which network-related parameters and constraints may be managed in order to improve the quality of delivered content. For example, the first quality score may be used by the upstream device to identify issues associated with a deployment scheme used by the content distribution network and cause adjustments to be made accordingly. As another example, if the first quality score is a low value (e.g., indicative of poor QoE level), it may be due to peak usage of the content distribution network, and the upstream device may instruct the transcoder to generate a next content segment at an intermediate bitrate (e.g., medium-quality rather than best quality) based on an amount of available network bandwidth associated with part, or all, of the content distribution network. The upstream device may also cause an auxiliary cache (e.g., a CDN cache, a CDN datacenter, etc.) to provide further content segments of the content item to the first computing device.

At step 640, the second content segment may be sent to the first device. The second content segment may be sent based on (e.g., in response to) receiving the first quality score. The second content segment may be associated with the quality level associated with the first content segment (e.g., a same bitrate as that of the first content segment). The second content segment may be associated with a quality level that differs from the quality level associated with the first content segment. For example, the classification metadata of the first content segment may indicate that the first content segment was assigned a "high" quality level by the transcoder, and classification metadata of the second content segment may indicate that the second content segment was assigned a "medium" quality level by the transcoder. Based on the classification metadata of the second content segment and one or more further output metrics associated with output of the second content segment, the first computing device may determine a second quality score. The second quality score may have a greater value than the first quality score. The second quality score may be sent via the first computing device to the upstream device along with an indication of an amount of available bandwidth and/or processing resources available at the first computing device. The upstream device may generate a third content segment based on the indicated amount of available bandwidth and/or processing resources. The third content segment may be a further portion of the content item (e.g., a duration of the content item), a number of packets of data relating to the content item, a chapter/scene of the content item, and the like.

The third content segment may be associated with a quality level that differs from one or more of the quality level associated with the first content segment or the quality level associated with the second content segment. For example, the classification metadata of the first content segment may indicate that the first content segment was assigned a "high" quality level by the transcoder, and the classification metadata of the second content segment may indicate that the second content segment was assigned a "medium" quality level by the transcoder. The third content segment may have classification metadata indicating that the transcoder assigned a "high" quality level to the third content segment. The amount of available bandwidth and/or processing resources at the first computing device may be improved by the first computing device making one or more adjustments to one or more output parameters in response to the first quality score having a low value.

As an example, adjusting the one or more output parameters may include the first computing device adjusting a bandwidth setting of a gateway device, such as the network device 210 or 310, and/or determining a source of interference associated with the gateway device (e.g., radio frequency interference caused by an appliance; a heavily-trafficked wireless communications channel, etc.). Radio frequency interference may be associated with the gateway device and one or more of a communications terminal, such as CT 122; a first access point, such as the first access point 123; a second access point, such as the second access point 124; and/or a network component, such as the network component 129. For example, the first computing device may experience one or more output glitches (e.g., resulting from lost packets, bit errors, signal noise, etc.) while outputting (e.g., playing, streaming, etc.) a given content segment. The given content segment may become inaccessible or incur a reduction of output quality due to noise or bandwidth reduction. Such issues may be caused by a device unrelated to the output of the content segment, such as noise from a microwave or other electrical appliance, or from a bandwidth reduction caused by a large download initiated by another computing device in communication with the gateway device.

Upon detecting/determining a source of interference, the first computing device may instruct a user device (e.g., via a message displayed at, or sent to, a user interface of the user device) of methods/processes by which the source of interference may be eliminated (e.g., a suggestion to move one or both of the gateway device or the user device). The first computing device may adjust an amount of transmit power allocated to the gateway device. For example, an adjustment could include increasing a data transmission rate of the gateway device, increasing an amount of power of one or more amplifiers of the gateway device, and/or increasing a number of ports activated in the gateway device. As another example, an adjustment may be in the form of changing a utilization of the gateway device by the first computing device instructing the gateway device to change a current wireless communication channel. The first computing device may adjust the one or more output parameters prior to sending the indication of the amount of available bandwidth and/or processing resources to the upstream device.

Figure 7:
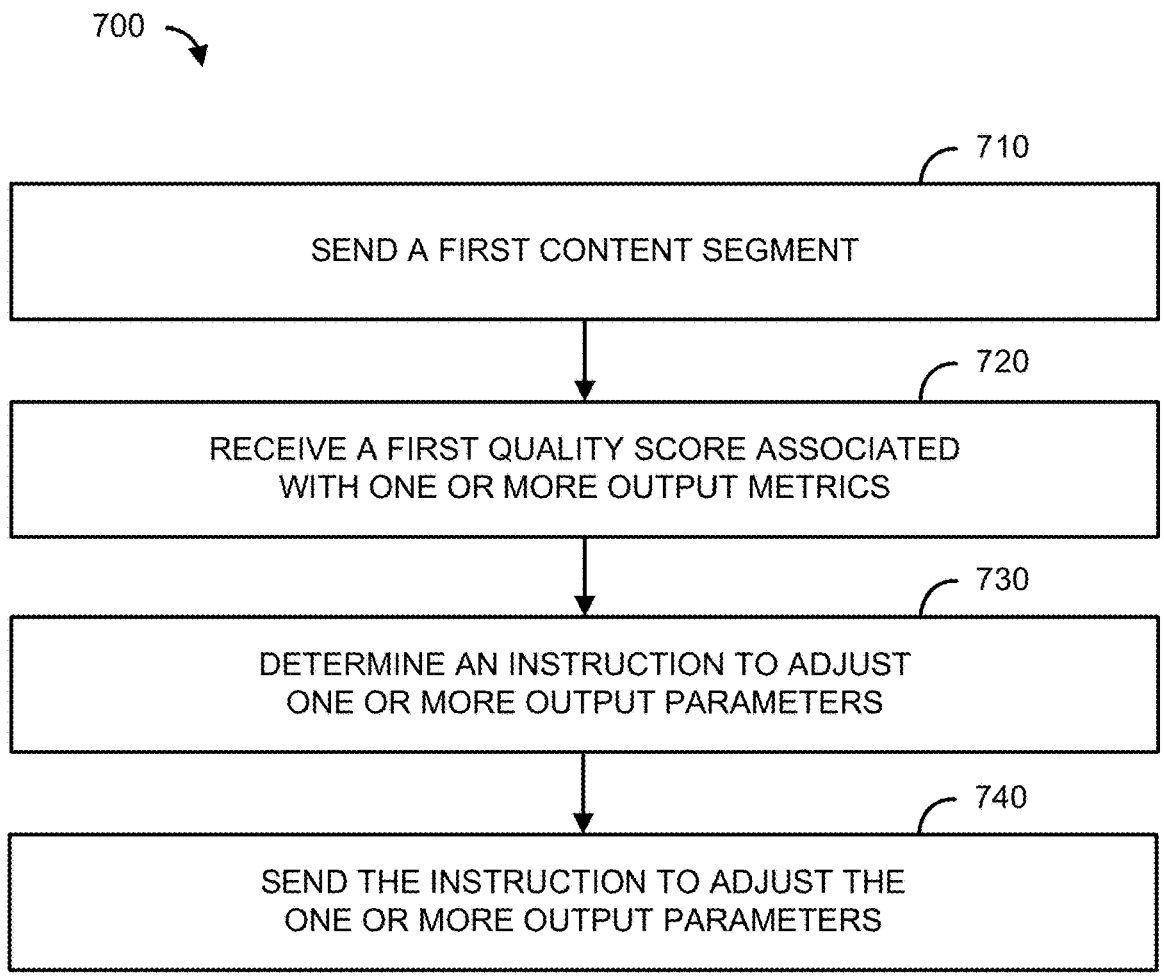
FIG. 7 shows a flowchart of an example method for content scoring and delivery.

FIG. 7 is a flowchart of a method 700 for content scoring and delivery in accordance with the present description. Method 700 may be implemented using the system 100 of FIG. 1, the system 200 of FIG. 2, and/or the system 300 of FIG. 3. At step 710, a first content segment for a content item may be sent to a first computing device. The first content segment may be a portion of a content item (e.g., a duration of the content item), a number of packets of data relating to the content item, a chapter/scene of the content item, and the like. The first content segment may be caused to be sent by an upstream device (e.g., component) of a content distribution network, such as the M&A Engine 202 or the M&A Engine 302. The upstream device may be in communication with one or more of a transcoder, a CDN cache, or a CDN datacenter. The first computing device may be a user device, such as the media device 120, the mobile device 124, or any other user device described herein. The first content segment may be sent with associated classification metadata. The classification metadata may be appended to the first content segment by the transcoder, such as the ABR Transcoder 204 of FIG. 2 or the ABR Transcoder 304 of FIG. 3. For example, the transcoder may receive the first content segment from a content source and assign a quality level (e.g., low, medium, high, etc.) to the first content segment. The assigned quality level may be indicated by the classification metadata.

The first computing device may determine one or more output metrics associated with output of the first content segment at the first computing device. The one or more output metrics may be based on the classification metadata. Each of the one or more output metrics may be, for example, a duration of playback of the content item at the quality level associated with the first content segment; an amount of quality downshifts; a frequency of the quality downshifts; a playback failure; a seek latency; an amount of time associated with buffering the first content segment; an amount of buffering events; a frequency of the buffering events; a combination thereof, and/or the like.

At step 720, a first quality score associated with output of the first content segment at the first computing device may be received via the first computing device. The first quality score may be determined by the first computing device using the VVQS method described herein. The first quality score may be associated with a QoE level as described herein. The first quality score may be based on the one or more output metrics. The first quality score may be based on a comparison (e.g., by the user device) of the one or more output metrics to a corresponding benchmark value. The corresponding benchmark value may be based on various user devices operating under a range of video playback scenarios (e.g., varying bandwidth, processing resource availability, etc.). For example, an output metric may be a duration of time the user device outputs the content item (e.g., a content segment) at a low quality level, and the corresponding benchmark value may be a threshold duration of time (e.g., 30% of the content item's total duration in seconds) of outputting content at the low quality level. When the output metric indicates the duration of time the user device outputs the content item at the low quality level meets or exceeds the threshold duration of time, the user device may factor this comparison into the first quality score (e.g., it may be weighed more heavily in determining the first quality score).

As another example, based on one or more of the classification metadata or the one or more output metrics, at least one impact coefficient associated with output of the first content segment may be determined. The at least one impact coefficient may be a coefficient/factor/constant as described herein regarding the VVQS method. Based on the at least one impact coefficient and at least one of the one or more output metrics, the first quality score may be determined.

At step 730, an instruction to adjust one or more output parameters may be determined (e.g., by the upstream device). The instruction may be based on the first quality score. For example, the instruction may be based on the first quality score not meeting a quality threshold (e.g., a value of the first quality score may be less than a value of the quality threshold). The upstream device may use the first quality score to determine methods/processes by which network-related parameters and constraints may be managed in order to improve the quality of delivered content. For example, the first quality score may be used by the upstream device to identify issues associated with a deployment scheme used by the content distribution network and cause adjustments to be made accordingly. As another example, if the first quality score is a low value (e.g., indicative of poor QoE level), it may be due to peak usage of the content distribution network, and the upstream device may instruct the transcoder to generate a next content segment at an intermediate bitrate (e.g., medium-quality rather than best quality) based on an amount of available network bandwidth associated with part, or all, of the content distribution network. The upstream device may also cause an auxiliary cache (e.g., a CDN cache, a CDN datacenter, etc.) to provide further content segments of the content item to the first computing device.

At step 740, the instruction to adjust the one or more output parameters may be sent to the first computing device. The instruction may be sent via the upstream device in response to the upstream device having received the first quality score. The instruction may cause the first computing device to adjust one or more output parameters by, for example, causing the first computing device to adjust a bandwidth setting of a gateway device, such as the network device 210 or 310, and/or determining a source of interference associated with the gateway device (e.g., radio frequency interference caused by an appliance; a heavily-trafficked wireless communications channel, etc.). Radio frequency interference may be associated with the gateway device and one or more of a communications terminal, such as CT 122; a first access point, such as the first access point 123; a second access point, such as the second access point 124; and/or a network component, such as the network component 129. For example, the first computing device may experience one or more output glitches (e.g., resulting from lost packets, bit errors, signal noise, etc.) while outputting (e.g., playing, streaming, etc.) a given content segment. The given content segment may become inaccessible or incur a reduction of output quality due to noise or bandwidth reduction. Such issues may be caused by a device unrelated to the output of the content segment, such as noise from a microwave or other electrical appliance, or from a bandwidth reduction caused by a large download initiated by another computing device in communication with the gateway device.

Upon detecting/determining a source of interference, the first computing device may instruct a user device (e.g., via a user interface of the first computing device) of methods/ processes by which the source of interference may be eliminated (e.g., a suggestion to move one or both of the gateway device or the user device). The first computing device may adjust an amount of transmit power allocated to the gateway device. For example, an adjustment could include increasing a data transmission rate of the gateway device, increasing an amount of power of one or more amplifiers of the gateway device, and/or increasing a number of ports activated in the gateway device. As another example, the instruction may cause the first computing device to instruct the gateway device to change a current wireless communication channel. The first computing device may be caused to adjust the one or more output parameters prior to sending an indication of an amount of available bandwidth and/or processing resources to the upstream device.

A second content segment may be sent to the first computing user device. The second content segment may be a further portion of the content item (e.g., a duration of the content item), a number of packets of data relating to the content item, a chapter/scene of the content item, and the like. The second content segment may be sent to the first computing device in response to the upstream device having received the first quality score. The second content segment may be associated with the quality level associated with the first content segment (e.g., a same bitrate as that of the first content segment). The second content segment may be associated with a quality level that differs from the quality level associated with the first content segment. For example, the classification metadata of the first content segment may indicate that the first content segment was assigned a "high" quality level by the transcoder, and classification metadata of the second content segment may indicate that the second content segment was assigned a "medium" quality level by the transcoder. Based on the classification metadata of the second content segment and one or more further output metrics associated with output of the second content segment, a second quality score may be determined by the first computing device. The second quality score may have a greater value than the first quality score. The second quality score may be sent via the first computing device to the upstream device along with the indication of the amount of available bandwidth and/or processing resources available at the user device. The upstream device may generate a third content segment based on the indicated amount of available bandwidth and/or processing resources. The third content segment may be a further portion of the content item (e.g., a duration of the content item), a number of packets of data relating to the content item, a chapter/scene of the content item, and the like.

The third content segment may be associated with a quality level that differs from one or more of the quality level associated with the first content segment or the quality level associated with the second content segment. For example, the classification metadata of the first content segment may indicate that the first content segment was assigned a "high" quality level by the transcoder, and the classification metadata of the second content segment may indicate that the second content segment was assigned a "medium" quality level by the transcoder. The third content segment may have classification metadata indicating that the transcoder assigned a "high" quality level to the third content segment.

Figure 8:
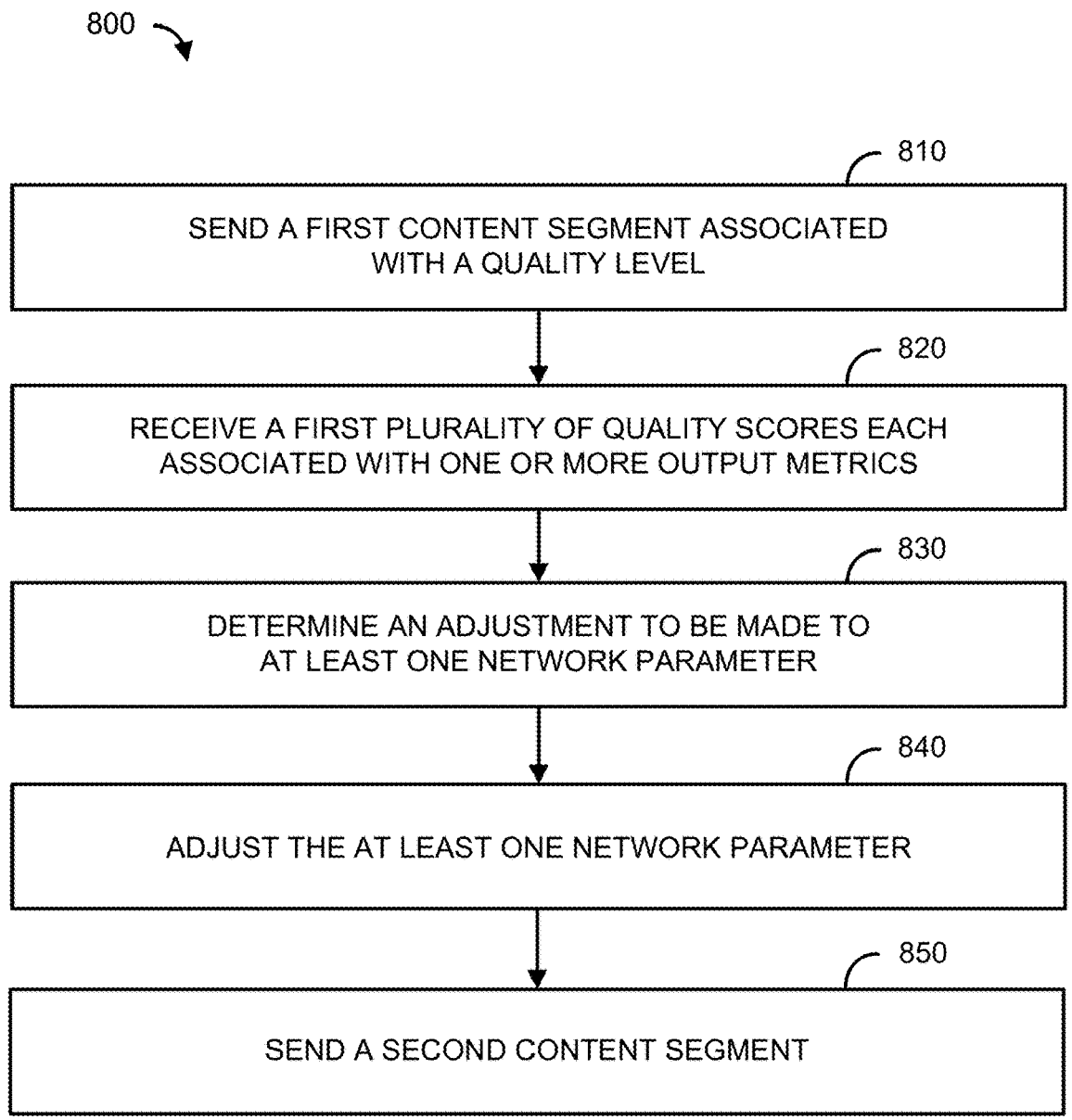
FIG. 8 shows a flowchart of an example method for content scoring and delivery.

FIG. 8 is a flowchart of a method 800 for content scoring and delivery in accordance with the present description. Method 800 may be implemented using the system 100 of FIG. 1, the system 200 of FIG. 2, and/or the system 300 of FIG. 3. At step 810, a first content segment for a content item may be sent to a plurality of computing devices. The first content segment may be a portion of a content item (e.g., a duration of the content item), a number of packets of data relating to the content item, a chapter/scene of the content item, and the like. The first content segment may be caused to be sent by an upstream device (e.g., component) of a content distribution network, such as the M&A Engine 202 or the M&A Engine 302. The upstream device may be in communication with one or more of a transcoder, a CDN cache, or a CDN datacenter. Each of the plurality of computing devices may be a user device, such as the media device 120, the mobile device 124, or any other user device described herein. The first content segment may be sent with associated classification metadata. The classification metadata may be appended to the first content segment by the transcoder, such as the ABR Transcoder 204 of FIG. 2 or the ABR Transcoder 304 of FIG. 3. For example, the transcoder may receive the first content segment from a content source and assign a quality level (e.g., low, medium, high, etc.) to the first content segment. The assigned quality level may be indicated by the classification metadata.

Each of the plurality of computing devices may determine one or more output metrics associated with output of the first content segment. The one or more output metrics may be based on the classification metadata. Each of the one or more output metrics may be, for example, a duration of playback of the content item at the quality level associated with the first content segment; an amount of quality downshifts; a frequency of the quality downshifts; a playback failure; a seek latency; an amount of time associated with buffering the first content segment; an amount of buffering events; a frequency of the buffering events; a combination thereof, and/or the like.

At step 820, a first plurality of quality scores associated with one or more output metrics determined by each of the plurality of computing devices may be received. The first plurality of quality scores may be received by the upstream device. Each of the first plurality of quality scores may be determined by a given computing device of the plurality of computing devices using the VVQS method described herein. Each respective first quality score of the first plurality of quality scores may be associated with a respective QoE level as described herein for a respective computing device of the plurality of computing devices. The first plurality of quality scores may be based on the one or more output metrics determined by each of the plurality of computing devices. For example, based on one or more of the classification metadata or the one or more output metrics, a given computing device of the plurality of computing devices may determine at least one impact coefficient associated with output of the first content segment. The at least one impact coefficient may be a coefficient/factor/constant as described herein regarding the VVQS method. Based on the at least one impact coefficient and at least one of the one or more output metrics, the given computing device may determine a first quality score. The first quality score may be based on a comparison (e.g., by the computing device) of the one or more output metrics to a corresponding benchmark value. The corresponding benchmark value may be based on various user devices operating under a range of video playback scenarios (e.g., varying bandwidth, processing resource availability, etc.). For example, an output metric may be a duration of time the computing device outputs the content item (e.g., a content segment) at a low quality level, and the corresponding benchmark value may be a threshold duration of time (e.g., 30% of the content item's total duration in seconds) of outputting content at the low quality level. When the output metric indicates the duration of time the computing device outputs the content item at the low quality level meets or exceeds the threshold duration of time, the computing device may factor this comparison into the first quality score (e.g., it may be weighed more heavily in determining the first quality score).

At step 830, an adjustment to be made to at least one network parameter may be determined. The determined adjustment may be based on at least one of the one or more output metrics. For example, the upstream device may use the first plurality of quality scores and/or the at least one of the one or more output metrics to determine methods/processes by which network-related parameters and constraints may be managed in order to improve the quality of delivered content. For example, the first quality score may be used by the upstream device to identify issues associated with a deployment scheme used by the content distribution network. As another example, if the first plurality of quality scores each have a low value (e.g., indicative of poor QoE level), it may be due to peak usage of the content distribution network.

At step 840, the at least one network parameter may be adjusted. For example, the upstream device may instruct the transcoder to generate a next content segment at an intermediate bitrate (e.g., medium-quality rather than best quality) based on an amount of available network bandwidth associated with part, or all, of the content distribution network. The upstream device may also cause an auxiliary cache (e.g., a CDN cache, a CDN datacenter, etc.) to provide further content segments of the content item to the plurality of computing devices.

At step 850, a second content segment may be sent to the plurality of computing devices. The second content segment may be a further portion of the content item (e.g., a duration of the content item), a number of packets of data relating to the content item, a chapter/scene of the content item, and the like. The second content segment may be sent in response to receiving the first plurality of quality scores. The second content segment may be associated with the quality level associated with the first content segment (e.g., a same bitrate as that of the first content segment). The second content segment may be associated with a quality level that differs from the quality level associated with the first content segment. For example, the classification metadata of the first content segment may indicate that the first content segment was assigned a "high" quality level by the transcoder, and classification metadata of the second content segment may indicate that the second content segment was assigned a "medium" quality level by the transcoder.

A second plurality of quality scores associated with output of the second content segment at each of the plurality of computing devices may be received. The second plurality of quality scores may be received by the upstream device via the plurality of computing devices. Each of the plurality of computing devices may determine a respective quality score of the second plurality of quality scores based on the classification metadata of the second content segment and one or more further output metrics associated with output of the second content segment. Each respective quality score of the second plurality of quality scores may have a greater value than each respective quality score of the first plurality of quality scores. Each respective quality score of the second plurality of quality scores may be sent via a respective computing device to the upstream device along with an indication of an amount of available bandwidth and/or processing resources available at the respective computing device. The upstream device may generate a third content segment based on the indicated amount of available bandwidth and/or processing resources. The third content segment may be a further portion of the content item (e.g., a duration of the content item), a number of packets of data relating to the content item, a chapter/scene of the content item, and the like.

The third content segment may be associated with a quality level that differs from one or more of the quality level associated with the first content segment or the quality level associated with the second content segment. For example, the classification metadata of the first content segment may indicate that the first content segment was assigned a "high" quality level by the transcoder, and the classification metadata of the second content segment may indicate that the second content segment was assigned a "medium" quality level by the transcoder. The third content segment may have classification metadata indicating that the transcoder assigned a "high" quality level to the third content segment. The amount of available bandwidth and/or processing resources at a respective computing device may be improved by the respective computing device making one or more adjustments to one or more output parameters in response to the first quality score having a low value.

Each of the plurality of computing devices may be caused to adjust at one or more output parameters associated with each respective computing device. As an example, adjusting the one or more output parameters may include a given computing device adjusting a bandwidth setting of a gateway device, such as the network device 210 or 310, and/or determining a source of interference associated with the gateway device (e.g., radio frequency interference caused by an appliance; a heavily-trafficked wireless communications channel, etc.). Radio frequency interference may be associated with the gateway device and one or more of a communications terminal, such as CT 122; a first access point, such as the first access point 123; a second access point, such as the second access point 124; and/or a network component, such as the network component 129. For example, the given computing device may experience one or more output glitches (e.g., resulting from lost packets, bit errors, signal noise, etc.) while outputting (e.g., playing, streaming, etc.) a given content segment. The given content segment may become inaccessible or incur a reduction of output quality due to noise or bandwidth reduction. Such issues may be caused by a device unrelated to the output of the content segment, such as noise from a microwave or other electrical appliance, or from a bandwidth reduction caused by a large download initiated by another computing device in communication with the gateway device.

Upon detecting/determining a source of interference, the given computing device may instruct a user device (e.g., via a message displayed at, or sent to, a user interface of the user device) of methods/processes by which the source of interference may be eliminated (e.g., a suggestion to move one or both of the gateway device or the user device). The given computing device may adjust an amount of transmit power allocated to the gateway device. For example, an adjustment could include increasing a data transmission rate of the gateway device, increasing an amount of power of one or more amplifiers of the gateway device, and/or increasing a number of ports activated in the gateway device. As another example, an adjustment may be in the form of changing a utilization of the gateway device by the given computing device instructing the gateway device to change a current wireless communication channel. The given computing device may adjust the one or more output parameters prior to sending the indication of the amount of available bandwidth and/or processing resources to the upstream device.

Figure 9:
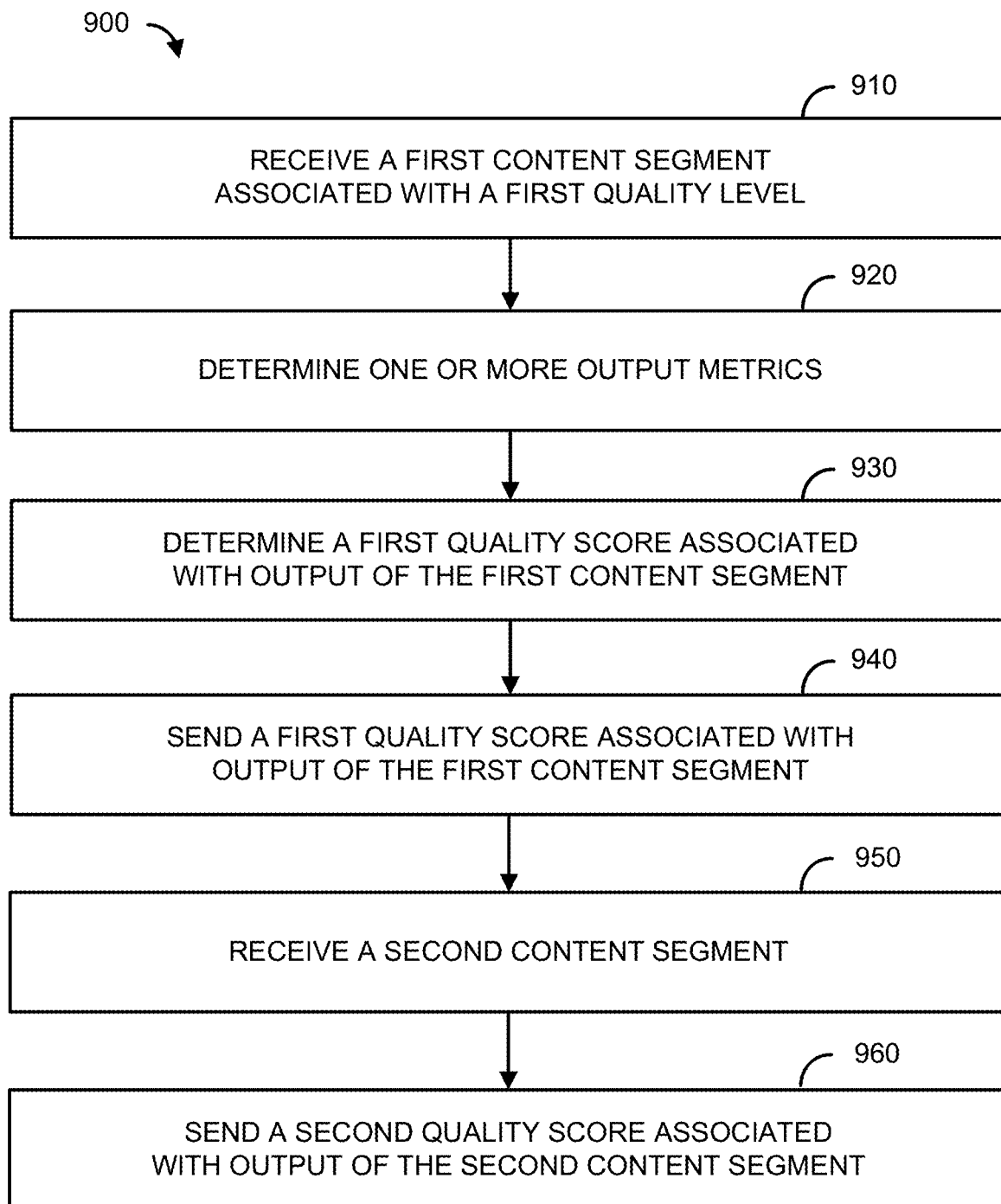
FIG. 9 shows a flowchart of an example method for content scoring and delivery.

FIG. 9 is a flowchart of a method 900 for content scoring and delivery in accordance with the present description. Method 900 may be implemented using the system 100 of FIG. 1, the system 200 of FIG. 2, and/or the system 300 of FIG. 3. At step 910, a first content segment for a content item may be received. The first content segment may be a portion of a content item (e.g., a duration of the content item), a number of packets of data relating to the content item, a chapter/scene of the content item, and the like. The first content segment may be received by a user device, such as the media device 120, the mobile device 124, or any other user device described herein. The first content segment may be sent via a first computing device. The first computing device may be an upstream device/component of a content distribution network, such as the M&A Engine 202 or the M&A Engine 302. The first computing device may be in communication with one or more of the transcoder, a CDN cache, or a CDN datacenter. The first content segment may be received with associated classification metadata. The classification metadata may be appended to the first content segment by a transcoder, such as the ABR Transcoder 204 of FIG. 2 or the ABR Transcoder 304 of FIG. 3. For example, a transcoder may receive the first content segment from a content source and assign a quality level (e.g., low, medium, high, etc.) to the first content segment. The assigned quality level may be indicated by the classification metadata.

At step 920, one or more output metrics may be determined. The one or more output metrics may be based on the classification metadata. Each of the one or more output metrics may be, for example, a duration of playback of the content item at the quality level associated with the first content segment; an amount of quality downshifts; a frequency of the quality downshifts; a playback failure; a seek latency; an amount of time associated with buffering the first content segment; an amount of buffering events; a frequency of the buffering events; a combination thereof, and/or the like.

At step 930, a first quality score associated with output of the first content segment may be determined. The first quality score may be determined using the VVQS method described herein. The first quality score may be associated with a QoE level as described herein. The first quality score may be based on the one or more output metrics. The first quality score may be based on a comparison (e.g., by the user device) of the one or more output metrics to a corresponding benchmark value. The corresponding benchmark value may be based on various user devices operating under a range of video playback scenarios (e.g., varying bandwidth, processing resource availability, etc.). For example, an output metric may be a duration of time the computing device outputs the content item (e.g., a content segment) at a low quality level, and the corresponding benchmark value may be a threshold duration of time (e.g., 30% of the content item's total duration in seconds) of outputting content at the low quality level. When the output metric indicates the duration of time the user device outputs the content item at the low quality level meets or exceeds the threshold duration of time, the user device may factor this comparison into the first quality score (e.g., it may be weighed more heavily in determining the first quality score).

As another example, based on one or more of the classification metadata or the one or more output metrics, at least one impact coefficient associated with output of the first content segment may be determined. The at least one impact coefficient may be a coefficient/factor/constant as described herein regarding the VVQS method. Based on the at least one impact coefficient and at least one of the one or more output metrics, the first quality score may be determined.

At step 940, the first quality score may be sent to the first computing device. The first quality score may be one of a first plurality of quality scores sent to the first computing device by a plurality of computing devices. Each of the first plurality of quality scores may be determined by a given computing device of the plurality of computing devices using the VVQS method described herein. Each respective first quality score of the first plurality of quality scores may be associated with a respective QoE level as described herein for a respective computing device of the plurality of computing devices. The first plurality of quality scores may be based on the one or more output metrics determined by each of the plurality of computing devices. For example, based on one or more of the classification metadata or the one or more output metrics, a given computing device of the plurality of computing devices may determine at least one impact coefficient associated with output of the first content segment. The at least one impact coefficient may be a coefficient/factor/constant as described herein regarding the VVQS method. Based on the at least one impact coefficient and at least one of the one or more output metrics, the given computing device may determine a first quality score. The first quality score may be based on a comparison (e.g., by the computing device) of the one or more output metrics to a corresponding benchmark value. The corresponding benchmark value may be based on various user devices operating under a range of video playback scenarios (e.g., varying bandwidth, processing resource availability, etc.). For example, an output metric may be a duration of time the computing device outputs the content item (e.g., a content segment) at a low quality level, and the corresponding benchmark value may be a threshold duration of time (e.g., 30% of the content item's total duration in seconds) of outputting content at the low quality level. When the output metric indicates the duration of time the computing device outputs the content item at the low quality level meets or exceeds the threshold duration of time, the computing device may factor this comparison into the first quality score (e.g., it may be weighed more heavily in determining the first quality score).

The first computing device may use the first quality score to determine methods/processes by which network-related parameters and constraints may be managed in order to improve the quality of delivered content. For example, the first quality score may be used by the computing device to identify issues associated with a deployment scheme used by the content distribution network and cause adjustments to be made accordingly. As another example, if the first quality score is a low value (e.g., indicative of poor QoE level), it may be due to peak usage of the content distribution network, and the computing device may instruct the transcoder to generate a next content segment at an intermediate bitrate (e.g., medium-quality rather than best quality) based on an amount of available network bandwidth associated with part, or all, of the content distribution network. The computing device may also cause an auxiliary cache (e.g., a CDN cache, a CDN datacenter, etc.) to provide further content segments of the content item.

At step 950, a second content segment may be received (e.g., by each of the plurality of computing devices). The second content segment may be a further portion of the content item (e.g., a duration of the content item), a number of packets of data relating to the content item, a chapter/scene of the content item, and the like. The second content segment may be received in response to each of the plurality of computing devices sending the first plurality of quality scores. The second content segment may be associated with the quality level associated with the first content segment (e.g., a same bitrate as that of the first content segment). The second content segment may be associated with a quality level that differs from the quality level associated with the first content segment. For example, the classification metadata of the first content segment may indicate that the first content segment was assigned a "high" quality level by the transcoder, and classification metadata of the second content segment may indicate that the second content segment was assigned a "medium" quality level by the transcoder.

At step 960, a second quality score may be sent to the first computing device. The second quality score may be one of a second plurality of quality scores sent to the first computing device by the plurality of computing devices. Each of the second plurality of quality scores may be received by the upstream device via the plurality of computing devices. Each of the plurality of computing devices may determine a respective quality score of the second plurality of quality scores based on the classification metadata of the second content segment and one or more further output metrics associated with output of the second content segment. Each respective quality score of the second plurality of quality scores may have a greater value than each respective quality score of the first plurality of quality scores. Each respective quality score of the second plurality of quality scores may be sent via a respective computing device to the upstream device along with an indication of an amount of available bandwidth and/or processing resources available at the respective computing device. The upstream device may generate a third content segment based on the indicated amount of available bandwidth and/or processing resources. The third content segment may be a further portion of the content item (e.g., a duration of the content item), a number of packets of data relating to the content item, a chapter/scene of the content item, and the like.

The third content segment may be associated with a quality level that differs from one or more of the quality level associated with the first content segment or the quality level associated with the second content segment. For example, the classification metadata of the first content segment may indicate that the first content segment was assigned a "high" quality level by the transcoder, and the classification metadata of the second content segment may indicate that the second content segment was assigned a "medium" quality level by the transcoder. The third content segment may have classification metadata indicating that the transcoder assigned a "high" quality level to the third content segment.

The amount of available bandwidth and/or processing resources at a respective computing device may be improved by a respective computing device making one or more adjustments to one or more output parameters in response to the first quality score having a low value. Each of the plurality of computing devices may be caused to adjust at one or more output parameters associated with each respective computing device. As an example, adjusting the one or more output parameters may include a given computing device adjusting a bandwidth setting of a gateway device, such as the network device 210 or 310, and/or determining a source of interference associated with the gateway device (e.g., radio frequency interference caused by an appliance; a heavily-trafficked wireless communications channel, etc.). Radio frequency interference may be associated with the gateway device and one or more of a communications terminal, such as CT 122; a first access point, such as the first access point 123; a second access point, such as the second access point 124; and/or a network component, such as the network component 129. For example, the given computing device may experience one or more output glitches (e.g., resulting from lost packets, bit errors, signal noise, etc.) while outputting (e.g., playing, streaming, etc.) a given content segment. The given content segment may become inaccessible or incur a reduction of output quality due to noise or bandwidth reduction. Such issues may be caused by a device unrelated to the output of the content segment, such as noise from a microwave or other electrical appliance, or from a bandwidth reduction caused by a large download initiated by another computing device in communication with the gateway device.

Upon detecting/determining a source of interference, the given computing device may instruct a user device (e.g., via a message displayed at, or sent to, a user interface of the user device) of methods/processes by which the source of interference may be eliminated (e.g., a suggestion to move one or both of the gateway device or the user device). The given computing device may adjust an amount of transmit power allocated to the gateway device. For example, an adjustment could include increasing a data transmission rate of the gateway device, increasing an amount of power of one or more amplifiers of the gateway device, and/or increasing a number of ports activated in the gateway device. As another example, an adjustment may be in the form of changing a utilization of the gateway device by the given computing device instructing the gateway device to change a current wireless communication channel. The given computing device may adjust the one or more output parameters prior to sending the indication of the amount of available bandwidth and/or processing resources to the upstream device.

Figure 10:
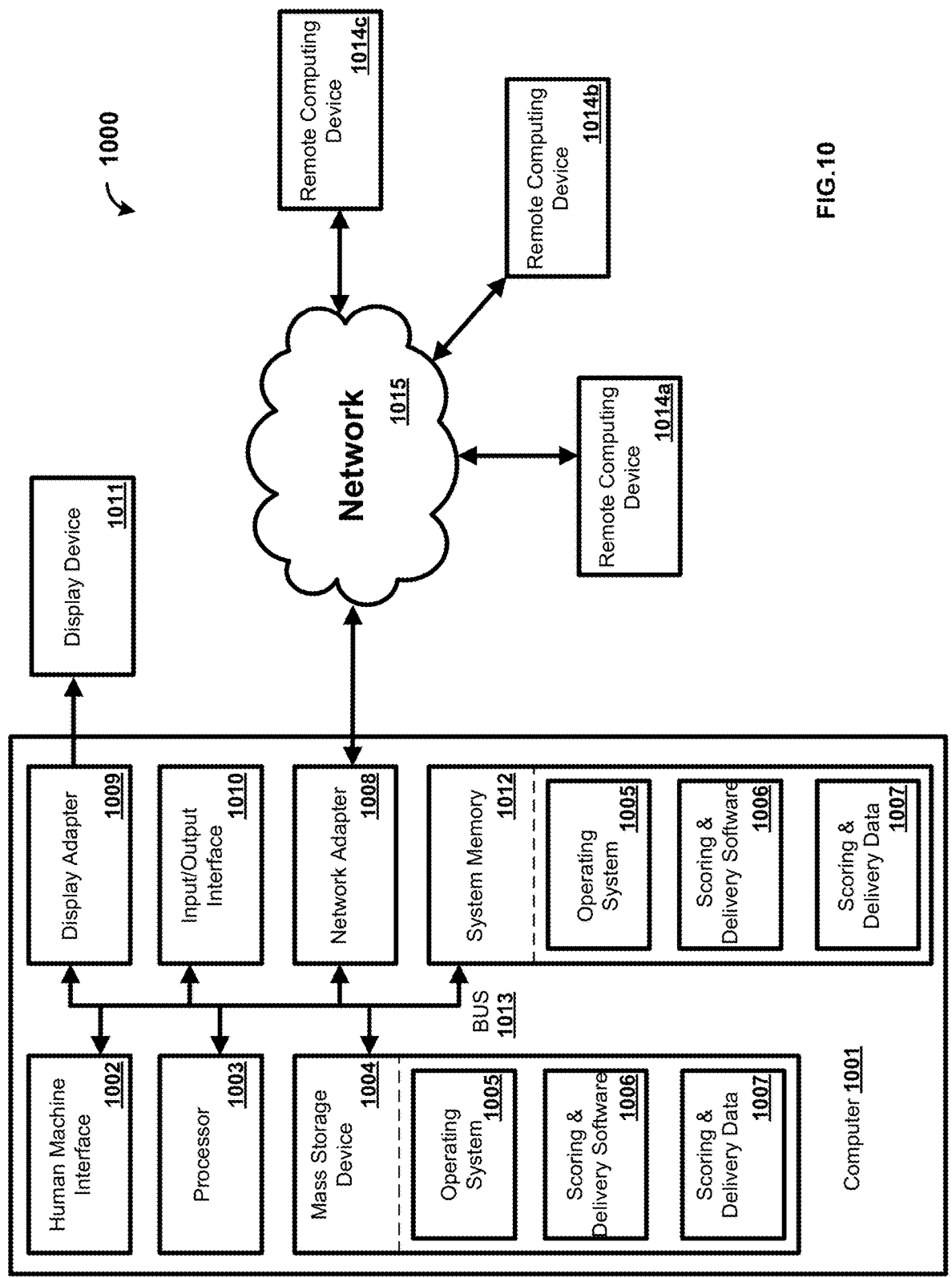
FIG. 10 shows a block diagram of an example computing device for content scoring and delivery.

FIG. 10 shows a system 1000 for content scoring and delivery in accordance with the present description. The central location 101, the server 110, the mobile device 106, the application server 106, the content source 107, and/or the edge device 108 of FIG. 1 may each be a computer 1001 as shown in FIG. 10. Each of the devices/entities shown in FIGS. 2 and 3 may be a computer 1001 as shown in FIG. 10. The computer 1001 may comprise one or more processors 1003, a system memory 1012, and a bus 1013 that couples various system components including the one or more processors 1003 to the system memory 1012. In the case of multiple processors 1003, the computer 1001 may utilize parallel computing. The bus 1013 is one or more of several possible types of bus structures, including a memory bus or memory controller, a peripheral bus, an accelerated graphics port, or local bus using any of a variety of bus architectures.

The computer 1001 may operate on and/or comprise a variety of computer readable media (e.g., non-transitory media). The readable media may be any available media that is accessible by the computer 1001 and may include both volatile and non-volatile media, removable and non-removable media. The system memory 1012 has computer readable media in the form of volatile memory, such as random access memory (RAM), and/or non-volatile memory, such as read only memory (ROM). The system memory 1012 may store data such as scoring and delivery data 1007 and/or program modules such as the operating system 1005 and scoring and delivery software 1006 that are accessible to and/or are operated on by the one or more processors 1003. The scoring and delivery software 1006 may use the scoring and delivery data 1007 to perform content scoring using the VVQS method and methods described herein. For example, one or more output metrics associated with output of a content segment at a user device may be determined by the computer 1001 using the scoring and delivery software 1006 and the scoring and delivery data 1007. The one or more output metrics may be stored in the system memory 1012.

The computer 1001 may also have other removable/non-removable, volatile/non-volatile computer storage media. FIG. 10 shows the mass storage device 1004 which may provide non-volatile storage of computer code, computer readable instructions, data structures, program modules, and other data for the computer 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004, such as the operating system 1005 and the scoring and delivery software 1006. Each of the operating system 1005 and the scoring and delivery software 1006 (e.g., or some combination thereof) may have elements of the program modules and the scoring and delivery software 1006. The scoring and delivery data 1007 may also be stored on the mass storage device 1004. The scoring and delivery data 1007 may be stored in any of one or more databases known in the art. Such databases may be DB2®, Microsoft® Access, Microsoft® SQL Server, Oracle®, mySQL, PostgreSQL, and the like. The databases may be centralized or distributed across locations within the network 1015.

A user may enter commands and information into the computer 1001 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1003 via a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

The display device 1011 may also be connected to the bus 1013 via an interface, such as the display adapter 1009. It is contemplated that the computer 1001 may have more than one display adapter 1009 and the computer 1001 may have more than one display device 1011. The display device 1011 may be a monitor, an LCD (Liquid Crystal Display), light emitting diode (LED) display, television, smart lens, smart glass, and/or a projector. In addition to the display device 1011, other output peripheral devices may be components such as speakers (not shown) and a printer (not shown) which may be connected to the computer 1001 via the Input/Output Interface 1010. Any step and/or result of the methods may be output (or caused to be output) in any form to an output device. Such output may be any form of visual representation, including, but not limited to, textual, graphical, animation, audio, tactile, and the like. The display device 1011 and computer 1001 may be part of one device, or separate devices.

The computer 1001 may operate in a networked environment using logical connections to one or more remote computing devices 1014a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1001 and a remote computing device 1014a,b,c may be made via a network 1015, such as a local area network (LAN) and/or a general wide area network (WAN). Such network connections may be through the network adapter 1008. The network adapter 1008 may be implemented in both wired and wireless environments. Such networking environments are conventional and commonplace in dwellings, offices, enterprise-wide computer networks, intranets, and the Internet.

Application programs and other executable program components such as the operating system 1005 are shown herein as discrete blocks, although it is recognized that such programs and components reside at various times in different storage components of the computing device 1001, and are executed by the one or more processors 1003 of the computer. An implementation of the scoring and delivery software 1006 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
   receiving, by a user device, a first content segment;
   determining, based on an output of the first content segment at the user device, one or more output metrics;
   determining, based on the one or more output metrics, a first quality score associated with the output of the first content segment;
   sending, to an upstream device, the first quality score; and
   receiving, based on the first quality score, a second content segment, wherein the second content segment is associated with a second quality level that differs from a first quality level associated with the first content segment.

2. The method of claim 1, further comprising adjusting, based on the first quality score, a bandwidth setting of a gateway device.

3. The method of claim 1, further comprising:
   determining a source of interference associated with the output of the first content segment; and
   causing a message identifying the source of interference to be displayed at the user device.

4. The method of claim 1, wherein the one or more output metrics comprises at least one of a duration of playback at the first quality level associated with the first content segment, an amount of quality downshifts, a frequency of the quality downshifts, a playback failure, a seek latency, an amount of time associated with buffering the first content segment, an amount of buffering events, or a frequency of the buffering events.

5. The method of claim 4, wherein determining the first quality score comprises:
   determining, based on at least one impact coefficient and at least one of the one or more output metrics, the first quality score, wherein the at least one impact coefficient is a weight for the at least one of the one or more output metrics, and wherein the at least one impact coefficient comprises one or more constant values that are system-defined or user-defined.

6. The method of claim 1, further comprising:
   determining, based on one or more further output metrics associated with an output of the second content segment, a second quality score, wherein the second quality score is indicative of a higher quality of experience as compared to a quality of experience indicated by the first quality score.

7. The method of claim 1, wherein sending the first quality score causes the upstream device to one or more of:
   send, to the user device, the second content segment at the second quality level that differs from the first quality level associated with the first content segment;
   adjust a deployment scheme associated with packaging the second content segment;
   generate, based on an amount of available bandwidth indicated by the user device, a third content segment associated with a third quality level that differs from one or more of the first quality level associated with the first content segment or the second quality level associated with the second content segment; or
   cause an auxiliary cache to provide further content segments requested by the user device.

8. A method comprising:
   receiving, by a user device, a first content segment;
   determining, based on an output of the first content segment at the user device, and based on classification metadata, one or more output metrics;
   determining, based on the classification metadata and the one or more output metrics, a first quality score associated with the output of the first content segment;
   sending, to an upstream device, the first quality score; and
   receiving, based on the first quality score, an instruction to adjust one or more output parameters for a second content segment.

9. The method of claim 8, further comprising adjusting, based on the instruction, a bandwidth setting of a gateway device.

10. The method of claim 8, further comprising:
    determining a source of interference associated with the output of the first content segment; and
    causing a message identifying the source of interference to be displayed at the user device.

11. The method of claim 8, wherein the one or more output metrics comprises at least one of a duration of playback at a first quality level associated with the first content segment, an amount of quality downshifts, a frequency of the quality downshifts, a playback failure, a seek latency, an amount of time associated with buffering the first content segment, an amount of buffering events, or a frequency of the buffering events.

12. The method of claim 11, wherein determining the first quality score comprises:
    determining, based on at least one impact coefficient and at least one of the one or more output metrics, the first quality score, wherein the at least one impact coefficient is a weight for the at least one of the one or more output metrics, and wherein the at least one impact coefficient comprises one or more constant values that are system-defined or user-defined.

13. The method of claim 8, further comprising:
    receiving, based on the one or more output parameters, the second content segment, wherein the second content segment is associated with a second quality level that differs from a first quality level associated with the first content segment; and
    determining, based on one or more further output metrics associated with an output of the second content segment, a second quality score, wherein the second quality score is indicative of a higher quality of experience as compared to a quality of experience indicated by the first quality score.

14. The method of claim 13, wherein sending the first quality score causes the upstream device to one or more of:
    send, to the user device, the second content segment at the second quality level that differs from the first quality level associated with the first content segment;
    adjust a deployment scheme associated with packaging the second content segment;
    generate, based on an amount of available bandwidth indicated by the user device, a third content segment associated with a third quality level that differs from one or more of the first quality level associated with the first content segment or the second quality level associated with the second content segment; or
    cause an auxiliary cache to provide further content segments requested by the user device.

15. A method comprising:
    sending, by an upstream device to a user device, a first content segment;
    receiving, via the user device, a first quality score associated with one or more output metrics, wherein the one or more output metrics are associated with an output of the first content segment at the user device;

determining, based on the received first quality score, a second content segment, wherein the second content segment is associated with a second quality level that differs from a first quality level associated with the first content segment; and sending, to the user device, the second content segment.

16. The method of claim 15, wherein the user device adjusts, based on the first quality score, a bandwidth setting of a gateway device.

17. The method of claim 15, further comprising:

determining, by the user device, a source of interference associated with the output of the first content segment; and causing, by the user device, a message identifying the source of interference to be displayed at the user device.

18. The method of claim 15, wherein the one or more output metrics comprises at least one of a duration of playback at the first quality level associated with the first content segment, an amount of quality downshifts, a frequency of the quality downshifts, a playback failure, or a seek latency, an amount of time associated with buffering the first content segment, an amount of buffering events, or a frequency of the buffering events.

19. The method of claim 18, wherein the first quality score is determined by the user device by:

determining, based on at least one impact coefficient and at least one of the one or more output metrics, the first quality score, wherein the at least one impact coefficient is a weight for the at least one of the one or more output metrics, wherein the at least one impact coefficient comprises one or more constant values that are system-defined or user-defined.

20. The method of claim 19, further comprising one or more of:

adjusting, based on the first quality score, a deployment scheme associated with packaging the second content segment;

generating, based on an amount of available bandwidth indicated by the user device, a third content segment associated with a third quality level that differs from one or more of the first quality level associated with the first content segment or the second quality level associated with the second content segment; or causing an auxiliary cache to provide further content segments requested by the user device.

* * * * *